US012761788B2

(12) United States Patent
Hamidouche et al.

(10) Patent No.: US 12,761,788 B2
(45) Date of Patent: Oct. 13, 2026

(54) ATOMIC MEMORY OPERATIONS

(71) Applicant: NVIDIA Corporation, Santa Clara, CA (US)

(72) Inventors: Khaled Hamidouche, Austin, TX (US); Manjunath Gorentla Venkata, San Ramon, CA (US); Petrus Gootzen, Zwolle (NL); Salvatore Di Girolamo, Zurich (CH); Zachary Tiffany, Minnetonka, MN (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/973,733

(22) Filed: Dec. 9, 2024

(65) Prior Publication Data

US 2026/0161284 A1 Jun. 11, 2026

(51) Int. Cl.
*G06F 3/06* (2006.01)
*G06F 9/54* (2006.01)

(52) U.S. Cl.
CPC .......... *G06F 3/0604* (2013.01); *G06F 3/0638* (2013.01); *G06F 3/067* (2013.01); *G06F 9/547* (2013.01)

(58) Field of Classification Search
CPC ...... G06F 3/0604; G06F 3/0638; G06F 3/067; G06F 9/547
See application file for complete search history.

(56) References Cited

U.S. PATENT DOCUMENTS

2004/0193734 A1* 9/2004 Barron .................... H04L 67/10 709/250
2020/0371700 A1* 11/2020 Stabrawa .............. G06F 3/0631
2020/0379664 A1* 12/2020 Mittal .................... G06F 3/0604
2021/0049123 A1 2/2021 Lahiri et al.
2021/0397524 A1 12/2021 Chen et al.
2023/0289075 A1* 9/2023 Agarwal ............... G06F 3/0604
2023/0367705 A1* 11/2023 Cariello .............. G06F 12/0246
2025/0294085 A1* 9/2025 Blagodurov ............ H04L 41/14

OTHER PUBLICATIONS

Extended European Search Report for European Application No. 25221403.6, mailed Apr. 20, 2026, 13 Pages.
Schuh H N et al., "Xenic: Smartnic-accelerated Distributed Transactions", Proceedings of the ACM SIGOPS 28th Symposium on Operating Systems Principles, Oct. 26, 2021, pp. 740-755.

* cited by examiner

*Primary Examiner* — Sean D Rossiter
(74) *Attorney, Agent, or Firm* — Lowenstein Sandler LLP

(57) ABSTRACT

Systems and methods for atomic memory operations in a remote direct memory access network are disclosed. A system includes a network interface card (NIC) comprising a first memory and one or more processors coupled to the first memory. The one or more processors are to receive an atomic memory operation (AMO) remote procedure call (RPC) comprising a memory address and an AMO type. The one or more processors are further to retrieve a value corresponding to the memory address of the AMO RPC from a second memory. The one or more processors are further to perform an AMO corresponding to the AMO type on the value from the second memory to obtain a modified value. The one or more processors are further to store the modified value in the first memory.

28 Claims, 18 Drawing Sheets

ATOMIC MEMORY OPERATIONS

TECHNICAL FIELD

At least one embodiment pertains to performing atomic memory operations in a remote direct access memory (RDMA) network, and in particular to performing atomic memory operations using a network interface controller (NIC).

BACKGROUND

Processing devices in a remote direct memory access (RDMA) network can be connected (e.g., via one or more network connections) such that a first processing device can access (e.g., read, write, etc.) memory of a second processing device. The memory access and/or modification can be performed as a one-sided operation using only the processing unit of the requesting device. For example, a first processing device can access the memory of a second processing device without involvement from the principal processing unit (e.g., central processing unit (CPU)) of the second processing device. This can leave the principal processing unit of the second processing device free to perform operations independent of the memory access from the first processing device.

DETAILED DESCRIPTION

Figure 1:
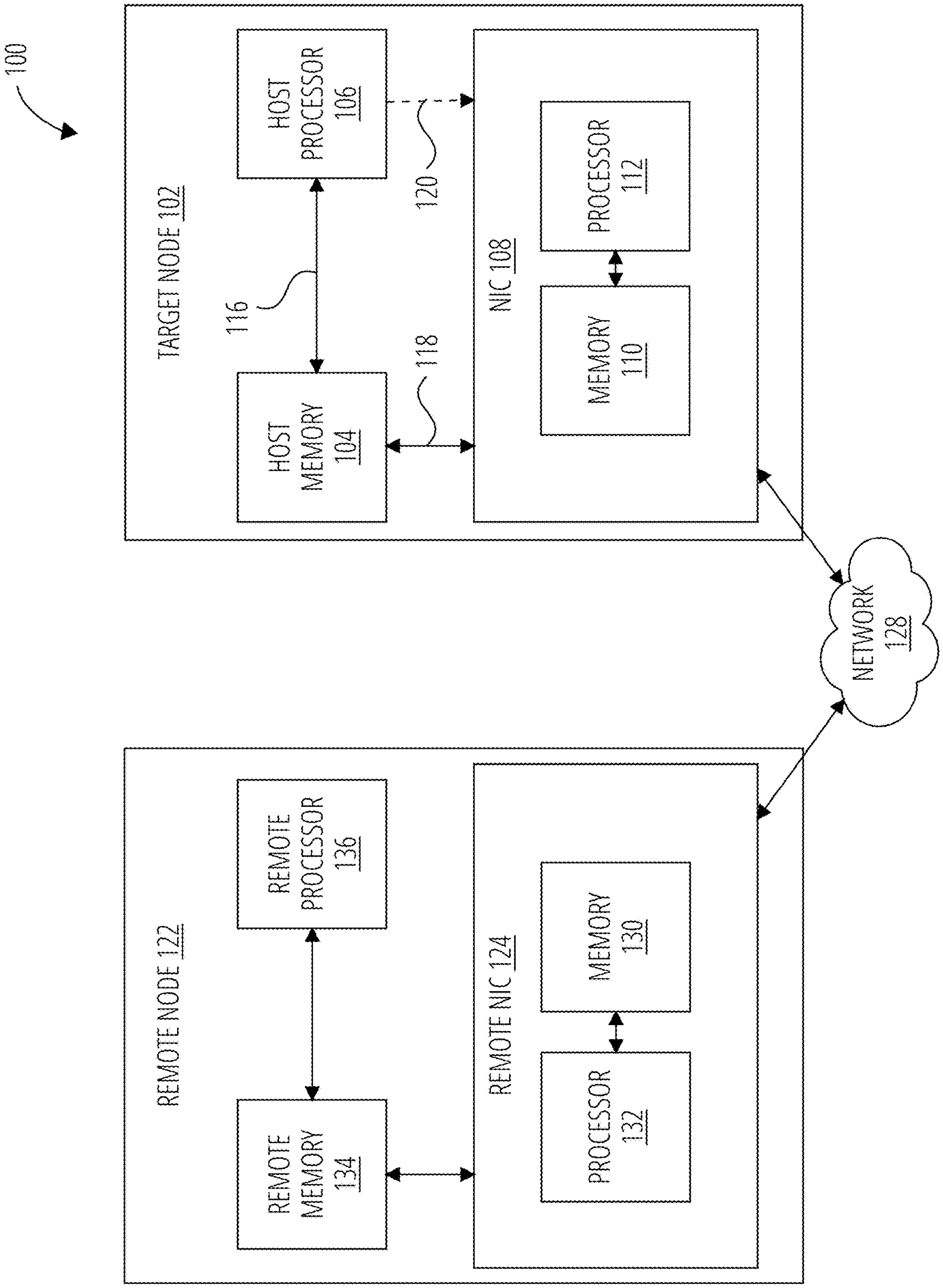
FIG. 1 is a block diagram of an example system for improved AMO performance in an RDMA network, according to at least one embodiment.

The processing devices of an RDMA network may include network interface cards (NICs) configured to perform atomic memory operations (AMOs) for the RDMA network. For example, a NIC can be configured to receive an RDMA packet, fetch a value from memory associated with a host processor based on the RDMA packet, perform one or more atomic operations on the value, store the modified value in the memory associated with the host processor, and return the modified value to the requesting device. The AMO may be completed once the modified value has been stored in the memory associated with the host processor and returned to the requesting device. However, going from the NIC to the host memory for each AMO can cause performance bottlenecks.

Aspects of the present disclosure address the above and other deficiencies by providing for improved AMO performance in an RDMA network. More specifically, the NICs of the processing devices in the RDMA network can be replaced by NICs referred to as "smart NICs" that include data processing units (DPUs) comprising one or more processing units and a memory. The memory of the DPU can be used as a cache for values used in AMOs from the RDMA network, and the AMOs can be performed by the one or more processing units of the DPU, resulting in improved performance of AMOs in the RDMA network. For example, an AMO may be directed to a host memory associated with a host processing device (e.g., a CPU or GPU). The DPU of a NIC may, upon receiving the AMO, retrieve the value of the host memory, modify the value, store the modified value in a local memory of the DPU, and return the modified value to the remote requestor. Notably, the AMO may be completed without first writing the updated value to the host memory. Additionally, if subsequent AMOs directed to that same memory address are received, the DPU may retrieve the modified value from its local memory, further modify the value, store the further modified value to local memory, and return the further modified value to the remote requestor. Accordingly, in some embodiments an AMO may be performed entirely on the NIC without reading from or writing to the host memory. This may decrease the amount of time that it takes to complete an AMO in embodiments.

The processing devices of the RDMA network can be configured to send AMO remote procedure calls (RPCs) instead of (or in addition to) RDMA packets in embodiments. The AMO RPCs can include a memory address on which to perform one or more operations and an AMO type. Upon receiving the AMO RPC, the DPU can fetch the value corresponding to the memory address of the AMO RPC from a memory of the processing device hosting the DPU (assuming the value isn't already cached in a memory of the DPU). The AMO of the AMO RPC can be performed by the one or more processing units of the DPU, and the resulting modified value can be stored in a memory of the DPU. Thus, the AMO may be completed without writing the updated value to the memory of the host processing device. The memory of the DPU can act as a cache in embodiments. If another AMO RPC is received and targets the same memory address (or another memory address that is still stored in the DPU's memory), the DPU can perform the AMO using the one or more processing units of the DPU and the value stored in the memory of the DPU (e.g., without loading the value from the memory of the processing device hosting the DPU).

The DPU can flush its memory to the memory of the processing device hosting the DPU periodically. For example, the DPU may flush its memory after every AMO. In some embodiments, the DPU may flush its memory after receiving a flush memory instruction (e.g., from a remote device of the RDMA network, from a processing unit of the host processing device, etc.) In some embodiments, the DPU may flush its memory after an occupancy of the DPU's memory satisfies an occupancy criterion. For example, the DPU may flush its memory after 90% of the DPU's memory is filled (e.g., "occupied"). In some embodiments, the DPU may flush its memory in response to receiving a synchronization instruction (e.g., from a remote device of the RDMA network). In some embodiments, the DPU may flush its memory in response to the host processing device attempting to perform one or more operations on the memory addresses that are cached in the memory of the DPU. For example, the host processing device (e.g., software running on the host processing device) may send a signal to the DPU indicating a memory address to be accessed. If the memory address is cached in the memory of the DPU, the DPU may flush its memory so the host processing device can access the current value at the memory address. This may ensure that the host processing device does not operate on stale data.

In some embodiments, one or more hardware circuits that can monitor memory access requests may be coupled between the DPU and the host processing device. If the one or more hardware circuits detect a memory access request from the host processing device for a memory address cached in the DPU's memory, the one or more hardware circuits may trigger a DPU memory flush before the memory address is accessed by the host processing device.

Thus, the DPU's memory can be used as a cache for AMOs in the RDMA network and the one or more processing units of the DPU can efficiently perform the AMOs.

The advantages of the disclosed techniques include but are not limited to improved AMO performance in an RDMA network.

FIG. 1 is a block diagram of an example system 100 for improved AMO performance in an RDMA network, according to at least one embodiment. System 100 can include target node 102 and remote node 122 connected via network 128. Network 128 can be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some embodiments, remote node 122 and target node 102 are nodes of a datacenter, and network 128 comprises one or more layers of switches connecting a plurality of nodes of the datacenter. For example, remote node 122 and target node 102 may each be server devices of a datacenter. Target node 102 and remote node 122 can be part of a remote direct memory access (RDMA) network in some embodiments. For example, remote node 122 can access memory of target node 102 (e.g., host memory 104, memory 110) via network 128 without requiring host processor 106 to perform any operations. In some embodiments, additional processing devices (e.g., additional nodes) can be included in the RDMA network and can be connected via network 128.

Target node 102 can include one or more host processors 106, host memory 104, and network interface card (NIC) 108, among other components. In some embodiments, target node 102 can be a desktop computer, a server, a laptop, a mobile device, a processing device of a datacenter, and/or the like. Host processor 106 can be used to perform one or more operations (e.g., execute one or more programs or applications). Host processor 106 can connect to host memory 104 via memory access 116 and can perform operations on host memory 104, so long as the memory addresses accessed are not currently cached in memory 110. If the memory addresses are cached in memory 110, host processor 106 can trigger a memory flush to cause the values from memory 110 to be written back to host memory 104.

Host memory 104 can include at least one of a flash memory or a random access memory (RAM), such as dynamic RAM (DRAM) or synchronous DRAM (SDRAM). In some embodiments, host memory 104 is accessible by remote devices within the RDMA network.

NIC 108 can include memory 110 and one or more processors 112. In some embodiments, one or more processors 112 comprise a DPU. The DPU is a specialized processor designed to handle data-centric tasks, complementing the traditional Central Processing Unit (CPU) and Graphics Processing Unit (GPU) in modern computing systems. DPUs are optimized for offloading, accelerating, and managing data processing tasks, often associated with network, storage, and security functions. DPUs are particularly valuable in cloud computing, data centers, and environments that require high-performance data handling. Examples of operations that may be performed by a DPU include networking offload (e.g., handling of network packet processing), storage acceleration (e.g., managing data movement between storage and compute resources), security processing, virtualization, and so on. In embodiments, processor 112 can perform atomic memory operations (AMOs) received from remote devices within the RDMA network (e.g., from remote node 122). In some embodiments, memory 110 of NIC 108 (e.g., of a DPU) can act as a cache for the AMOs. For example, the memory values accessed during the AMOs can be fetched from host memory 104 (e.g., an external memory) and cached in memory 110 (e.g., a local memory). Then, processor 112 can perform the AMO based on the value in memory 110, without having to write updated values to the host memory 104 to complete AMOs, and in some cases without having to read values from host memory 104 in order to perform AMOs (for subsequent AMOs directed to memory addresses of host memory 104 that are cached in memory 110). Periodically, the cached values in memory 110 can be flushed (e.g., written, stored, etc.) back to host memory 104.

In embodiments, host processor 106 may perform AMOs on memory addresses of host memory 104. Such AMOs may be performed without sending messages between NIC 108 and host processor 106 in some instances, such as for memory addresses that are not currently cached in memory 110. If host processor 106 attempts to perform an AMO or other operation on a memory address of host memory 104 that is cached in memory 110, this may trigger a flush operation to flush the cache (e.g., values of addresses in memory 110 corresponding to memory addresses of host memory 104). For example, host processor 106 may query NIC 108 and/or memory 110 to determine if a particular memory address is cached in memory 110. If the memory address is cached in memory 110, host processor 106 may send a signal to NIC 108 causing memory 110 to be flushed to host memory 104. Once the host memory 104 contains most recent values for its memory addresses, host processor 106 may perform operations on or using such values.

The AMOs can be performed in an atomic manner, such that once the operation begins execution, it cannot be interrupted by another process or thread. In some embodiments, in order to perform the AMOs, access to the memory values and/or addresses used in the AMO can be temporarily restricted to ensure consistency of results. For example, the memory address(es) can be "locked," the value at the memory address can then be read by the processor performing the AMO, the AMO can be performed, the new value can be written back to the memory address, and the memory address can be "unlocked." In some embodiments, the atomic execution of the AMO can be guaranteed using semaphores, memory barriers, and/or the like. The processor can ensure that execution of the AMO is not interrupted by another processor or processing thread.

NIC 108 may receive an AMO remote procedure call (RPC) from remote NIC 124 of remote NIC 124 of remote node 122. The AMO RPC may include an AMO type and a memory address. The AMO type may identify the AMO that should be performed on the value stored at the memory address of host memory 104. For example, the AMO corresponding to the AMO type can be a compare and swap operation, a fetch and add operation, a fetch and store operation, a fetch and exclusive or (XOR) operation, an atomic increment operation, an atomic decrement operation, a swap operation, a software-defined operation, and/or the like. In some embodiments, a software-defined operation can include a "load-link/store-conditional" operation that can be performed by a processor (e.g., processor 112 of NIC 108).

In some cases, the AMO RPC further includes one or more operators for the AMO. For example, if the AMO type corresponds to a "fetch and add" AMO, an operator can be included in the AMO RPC that includes the value to be added to the value stored at the memory address. As another example, if the AMO type corresponds to a "compare-and-swap" AMO, two operators can be included in the AMO RPC: a first for the conditional and a second for the potential swap.

In some embodiments, the RPCs used for sending AMOs are based on a protocol. In some embodiments, the protocol uses transmission control protocol (TCP)/internet protocol (IP) packets. In some embodiments, the protocol uses RDMA send and receive commands. In some embodiments, RDMA atomics are sent directly and are intercepted by NIC 108 (e.g., by a DPU of NIC 108) instead of using an RPC protocol.

After receiving the AMO RPC, NIC 108 can provide the AMO RPC to processor 112 for execution. Processor 112 can fetch a value from memory based on the memory address in the AMO RPC. In some cases, the value for the memory address is stored in host memory 104 and can be copied to memory 110 of NIC 108 (e.g., via memory access 118). In some cases, the value for the memory address is already in (e.g., is cached in) memory 110 of NIC 108. For example, a previous AMO may have targeted the same memory address, the memory value may have been copied into the cache, and the cache may not have been flushed back to host memory 104 yet. In some embodiments, a given memory address is available within both host memory 104 and memory 110, and the value in memory 110 can be given priority (e.g., used instead of the value in host memory 104).

Processor 112 can perform an AMO corresponding to the AMO type included in the AMO RPC on the cached value to obtain a modified value. The modified value can be stored back in the cache (e.g., memory 110). In some cases, the modified value is immediately stored in (e.g., flushed to) host memory 104 (e.g., the modified value can be stored in memory 110 and memory 110 can be immediately flushed to host memory 104 via memory access 118).

In some embodiments, NIC 108 can receive one or more AMO RPCs 120 from host processor 106. Although host processor 106 can access host memory 104 directly, in some cases, it can be advantageous to perform one or more AMOs via RPCs 120. For example, values used in the AMOs from host processor 106 may be stored in the cache (e.g., memory 110) such that the AMOs may be performed efficiently by processor 112 instead of having the values flushed from memory 110 to host memory 104 first. In some embodiments, host processor 106 may directly access host memory 104 (e.g., and perform an AMO on values from addresses of the host memory 104). Accordingly, embodiments combine the advantages of performing AMOs using host memory 104 and the advantages of performing AMOs using a memory of a NIC.

The values in memory 110 can be flushed to host memory 104 periodically. In some embodiments, the values are flushed in response to a memory flush trigger. In some embodiments, the memory flush trigger is a memory flush instruction that is received from another device of the RDMA network. For example, a remote device may send a "synchronization" instruction to all the devices of the RDMA network which can cause each device of the RDMA network to flush their respective AMO caches.

In some embodiments, the memory flush trigger is determining, based on one or more heuristics, that a state of the RDMA network and/or a state of target node 102 satisfies a flushing criterion. For example, the devices in the RDMA network can be cooperatively running an application that uses AMO caches (e.g., memory 110 of NIC 108). During execution of the application, each device can enter a "phase of execution" where it can be beneficial that the cache is flushed. The device can send an RPC to NIC 108 indicating that the cache will need to be flushed. After a predetermined percentage of the devices in the network (e.g., 10%, 50%, 90%, etc.) have reached this "phase of execution", a heuristic can determine that it is time to flush the cache.

As another example, in some embodiments, one memory flush trigger heuristic can be based on an occupancy of memory 110. For example, memory 110 may be flushed and values may be stored in host memory 104 if the occupancy of memory 110 satisfies an occupancy criterion, such as having an occupancy that exceeds an occupancy threshold (e.g., 20%, 60%, 80%, etc.).

In some embodiments, a memory flush trigger may be invoked based on host processor 106 attempting to access memory addresses that are cached in memory 110. For example, in some embodiments, when host processor 106 (e.g., software running on host processor 106) attempts to access a memory address, host processor 106 may query NIC 108 and/or memory 110 to determine if the memory address is cached in memory 110. If the memory address is cached, host processor 106 may send a signal to NIC 108 causing a flush of memory 110 to host memory 104. Host processor 106 may then access the current value at the memory address from memory 104.

In some embodiments, a memory address may be cached in memory 110 responsive to a caching criterion being satisfied. For example, memory 110 may cache memory addresses that have been accessed a threshold number of times within a threshold time period. In some embodiments, memory 110 may cache memory addresses if a particular region of memory including the memory address has been accessed a threshold number of times within a threshold time period. This may ensure that only memory addresses that are frequently accessed by remote nodes are cached so that host processor 106 does not need to wait for the cache to be flushed before accessing host memory 104 for most memory addresses.

In some embodiments, a remote device of the RDMA network can send an RDMA atomic command instead of an RPC AMO. In some embodiments, NIC 108 can receive the RDMA atomic command and execute the atomic operation. In some embodiments, NIC 108 can receive the RDMA atomic command and provide it to host processor 106 for execution.

Remote node 122 can include remote memory 134, remote processor 136, and remote NIC 124. Remote node 122 can be part of an RDMA network with target node 102. Remote node 122 can perform operations similarly to target node 102. For example, remote processor 136 can access remote memory 134 for execution of applications local to remote node 122. Remote NIC 124 can perform AMOs on remote memory 134 (e.g., via processor 132) using memory 130 as an AMO cache. Remote NIC 124 can be configured to send AMO RPCs to NIC 108 of target node 102 (e.g., from remote NIC 124 to NIC 108 via network 128).

Figure 2:
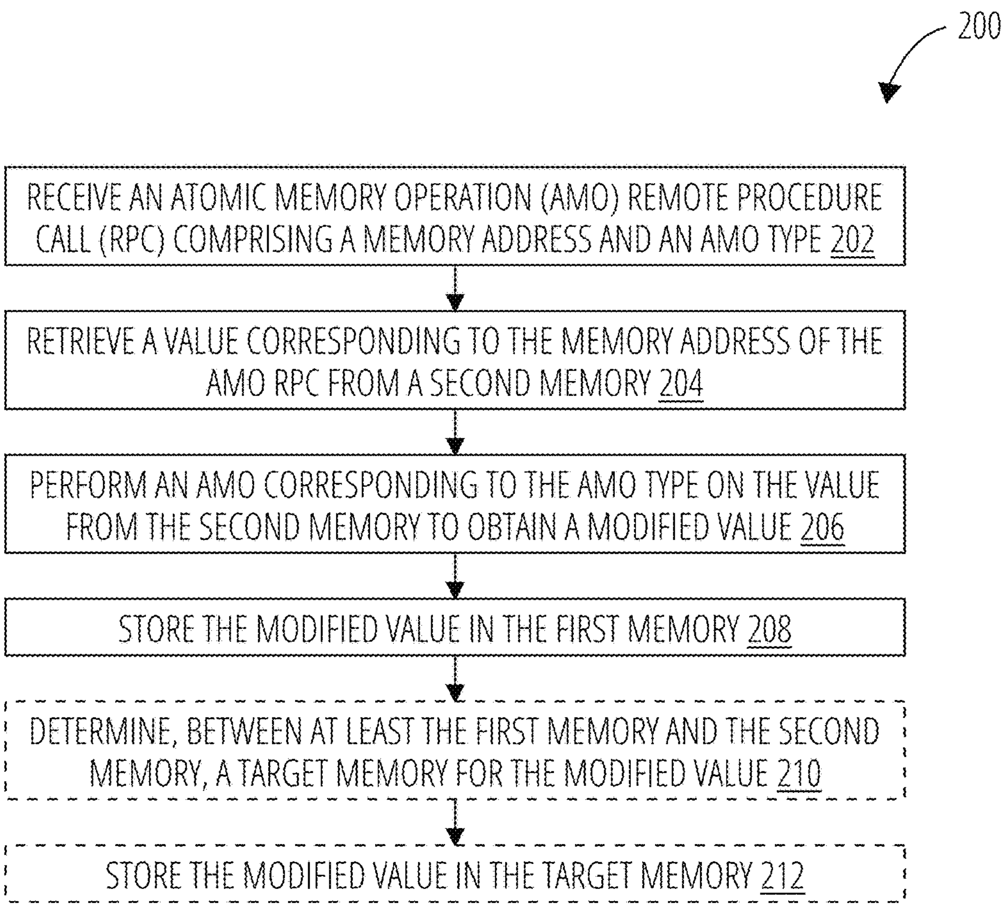
FIG. 2 is a flow diagram of an example method for improved AMO performance in an RDMA network, according to at least one embodiment.

FIG. 2 is a flow diagram of an example method 200 for improved AMO performance in an RDMA network, according to at least one embodiment.

Method 200 can be performed using one or more processing units (e.g., CPUs, GPUs, accelerators, physics processing units (PPUs), data processing units (DPUs), etc.), which may include (or communicate with) one or more memory devices. In at least one embodiment, method 200 can be performing using processing circuitry of a NIC. In at least one embodiment, method 200 can be performed using processing units of NIC 108 of FIG. 1. In at least one embodiment, processing units performing method 200 can be executing instructions stored on a non-transient computer readable storage media. In at least one embodiment, method 200 can be performed using multiple processing threads, individual threads executing one or more individual functions, routines, subroutines, or operations of the method. In at least one embodiment, processing threads implementing method 200 can be synchronized (e.g., using semaphores, critical sections, and/or other thread synchronization mechanisms). Alternatively, processing threads implementing method 200 can be executed asynchronously with respect to each other. Various operations of method 200 can be performed in a different order compared with the order shown in FIG. 2. Some operations of method 200 can be performed concurrently with other operations. In at least one embodiment, one or more operations shown in FIG. 2 may not always be performed.

At block 202, processing units executing method 200 can receive an atomic memory operation (AMO) remote procedure call (RPC) comprising a memory address and an AMO type. In some embodiments, the processing units are coupled to a first memory. In some embodiments, the processing units and the first memory are comprised within a data processing unit (DPU), such as a DPU of a NIC. In some embodiments, the AMO RPC is received from a remote processing device. For example, the processing units may be comprised within a DPU that is part of an RDMA network. A remote processing device can send an AMO RPC to the DPU to access (e.g., read, write, modify, etc.) memory stored on the DPU or on a memory of the device hosting the DPU. In some embodiments, the AMO RPC is received from a processor of the device hosting the DPU.

At block 204, processing units can retrieve a value corresponding to the memory address of the AMO RPC from a second memory. In some embodiments, the second memory is associated with one or more host processors. For example, the DPU may be part of a NIC and may be hosted within a computing device that includes the second memory and one or more host processors (e.g., such as GPUs, CPUs, etc.).

At block 206, processing units can perform an AMO corresponding to the AMO type on the value from the second memory to obtain a modified value. In some embodiments, the AMO corresponding to the AMO type comprises at least one of a compare and swap operation, a fetch and add operation, a fetch and store operation, a fetch and exclusive or (XOR) operation, an atomic increment operation, an atomic decrement operation, a swap operation, or a software-defined operation. For example, the AMO corresponding to the AMO type may use a load-link/store-conditional operation of the processing units for defining the atomic memory operation.

At block 208, processing units can store the modified value in the first memory. In some embodiments, processing units can further store the modified value in the second memory (e.g., can flush the values to the second memory). In some embodiments, storing the modified value in the second memory is responsive to a memory flush trigger. In some embodiments, the memory flush trigger is at least one of receiving a memory flush instruction (e.g., from another device of an RDMA network) or determining, based on one or more heuristics, that a state of a network of devices (e.g., the devices of an RDMA network) satisfies a flushing criterion. For example, the processing units and the first memory may be comprised within a first device that is part of the network of devices. The devices in the network can be cooperatively running an application that uses the atomic cache (e.g., the first memory of the DPU). During execution of the application, each device can enter a "phase of execution" where it can be beneficial that the cache is flushed. The device can send an RPC to the DPU indicating that the cache will need to be flushed. After a predetermined percentage of the devices in the network (e.g., 10%, 50%, 90%, etc.) have reached this "phase of execution", a heuristic can determine that it is time to flush the cache.

As another example, in some embodiments, one memory flush trigger heuristic can be based on an occupancy of the first memory (e.g., the AMO cache memory). For example, the first memory may be flushed and values may be stored in the second memory if the occupancy of the first memory satisfies an occupancy criterion, such as having an occupancy that exceeds an occupancy threshold (e.g., 20%, 60%, 80%, etc.).

In some embodiments, at block 210, processing units can determine, between at least the first memory and the second memory, a target memory for the modified value. In some embodiments, the determination is based on one or more heuristics related to the state of an RDMA network. For example, in some cases, it may be advantageous to store the modified value in the memory of the DPU because the value will be accessed frequently and many AMOs will be performed on the value. In some cases, it may be advantageous to flush the modified value from the DPU memory and store the modified value in the host memory. At block 212, processing units can store the modified value in the target memory.

In some embodiments, a host computing device or host computing devices are connected to the NIC. The host computing device may include one or more host processors (e.g., additional processors) and the second memory (e.g., additional memory). The second memory may be associated with the one or more host processors. The target memory address of the AMO RPC may be directed to the second memory associated with the one or more host processors.

Figure 3:
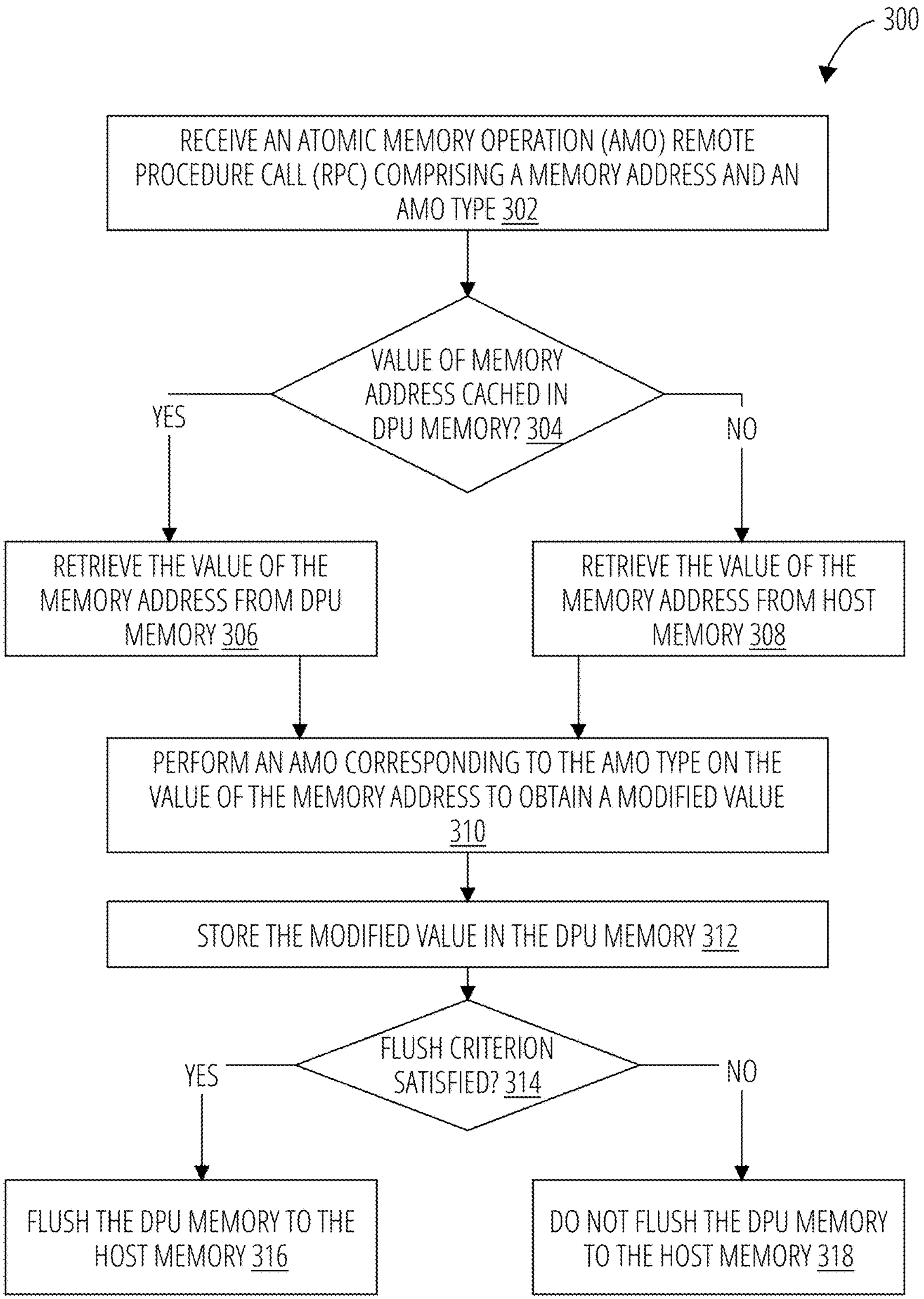
FIG. 3 is a flow diagram of an example method for improved AMO performance, according to at least one embodiment.

FIG. 3 is a flow diagram of an example method 300 for improved AMO performance, according to at least one embodiment. In some embodiments, method 300 can be performed by processing circuitry and/or processing units of a network interface card (NIC), as disclosed herein. The NIC may be hosted by a host device with one or more host processors and a host memory. The NIC may include a DPU with one or more processors and a DPU memory. At block 302, processing units can receive an atomic memory operation (AMO) remote procedure call (RPC) comprising a memory address and an AMO type. At decision block 304, processing units can determine if a value of the memory address is cached in a memory of the NIC (e.g., in the memory of the DPU of the NIC). If the value of the memory address is cached in the memory of the DPU, at block 306, processing units can retrieve the value of the memory address from the DPU memory. If the value of the memory address is not cached in the memory of the DPU, at block 308, processing units can retrieve the value of the memory address from the host memory (e.g., the memory of the device hosting the NIC). At block 310, processing units can perform an AMO corresponding to the AMO type on the retrieved value of the memory address to obtain a modified value. In some embodiments, the AMO is performed by the one or more processing units of the DPU. At block 312, processing units can store the modified value in the DPU memory. At decision block 314, processing units can determine if a flush criterion is satisfied. In some embodiments, the flush criterion can be receiving a flush instruction or determining that a state of a network of devices (e.g., devices in an RDMA network) satisfies a flushing criterion. If the flush criterion is satisfied, at block 316, processing units can flush the DPU memory to the host memory. If the flush criterion is not satisfied, at block 318, processing units may not flush the DPU memory to the host memory.

Figure 4:
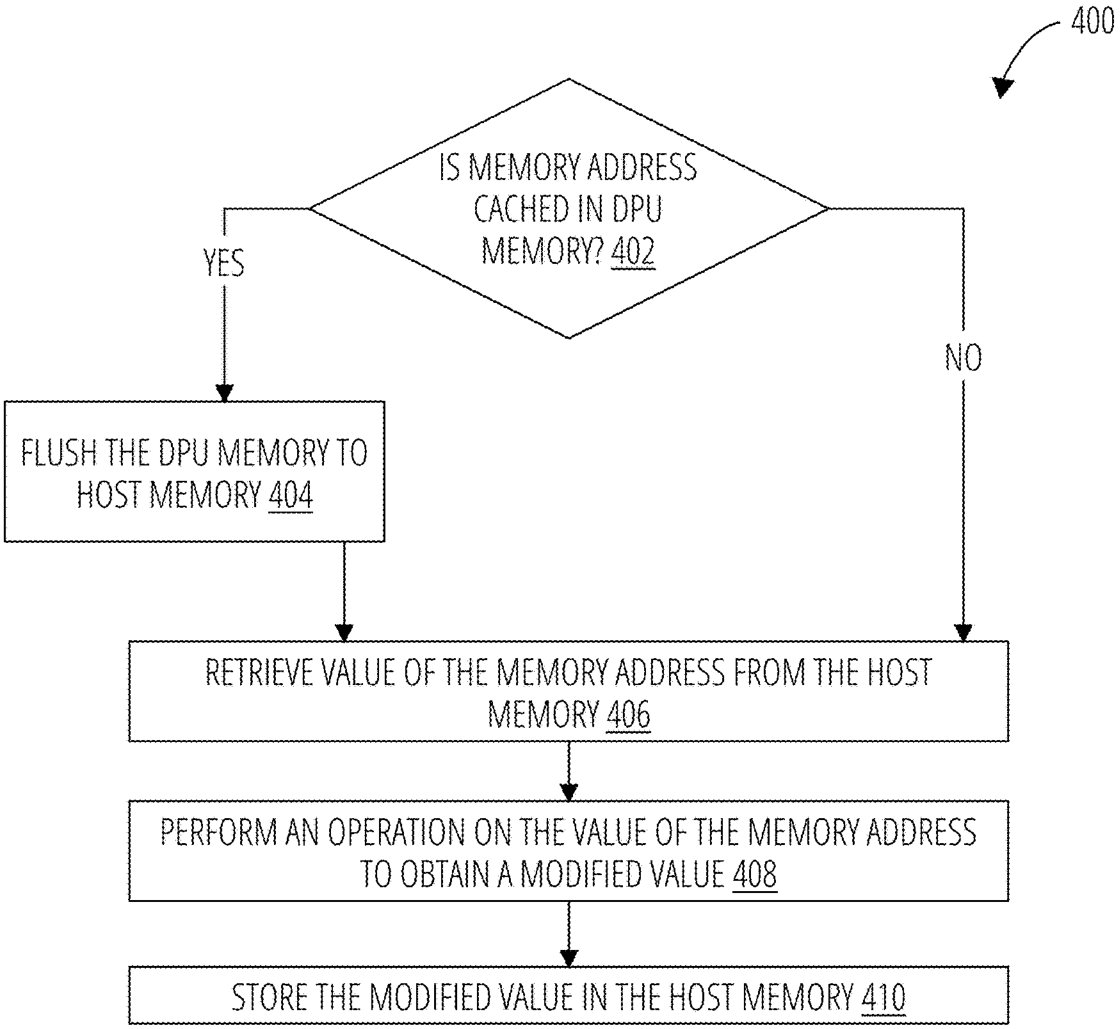
FIG. 4 is a flow diagram of an example method for performing memory operations within a host with a DPU, according to at least one embodiment.

FIG. 4 is a flow diagram of an example method 400 for performing memory operations within a host with a DPU, according to at least one embodiment. For example, a host device may include one or more processing units, a memory, and a NIC which comprises a DPU as discussed herein. The DPU may include one or more processing units and a memory. At block 402, processing units of the host device can determine if a memory address is cached in the DPU memory. For example, the host device may want to perform one or more operations on a particular memory address and may want to ensure the value at the memory address is not stale. If the memory address is cached in the DPU memory, at block 404, processing units can flush the DPU memory to the host memory. At block 406, processing units can retrieve the value of the memory address from the host memory. At block 408, processing units can perform an operation on the value of the memory address to obtain a modified value. At block 410, processing units can store the modified value in the host memory.

Computer Architecture

Figure 5:
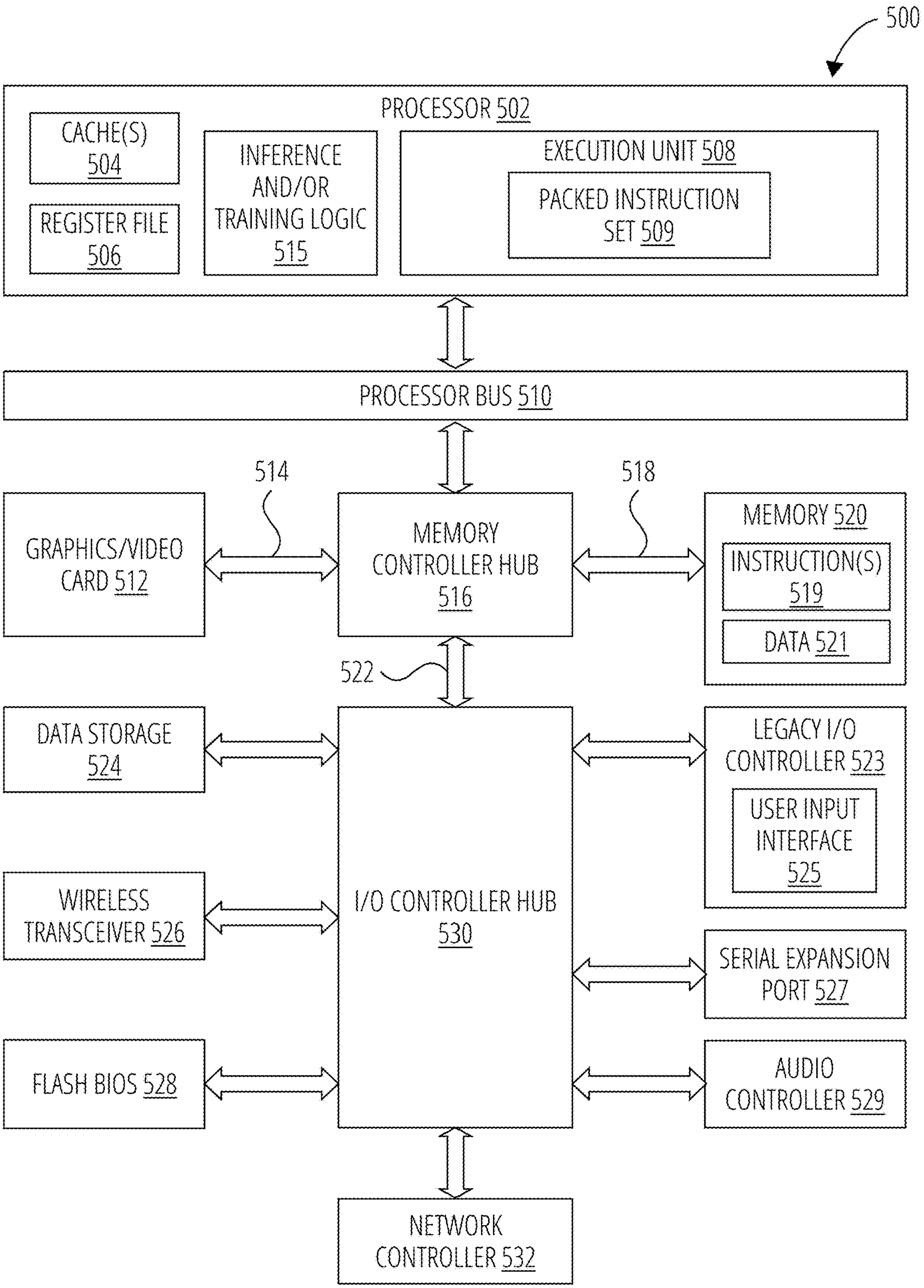
FIG. 5 is a block diagram illustrating an exemplary computer system, according to at least one embodiment.

FIG. 5 is a block diagram illustrating an exemplary computer system 500, which may be a system with interconnected devices and components, a system-on-a-chip (SOC) or some combination thereof formed with a processor that may include execution units to execute an instruction, according to at least one embodiment. In at least one embodiment, computer system 500 may include, without limitation, a component, such as a processor 502 to employ execution units including logic to perform algorithms for processing data, in accordance with embodiments of the present disclosure. In one example, computer system 500 corresponds to target node 102 and/or remote node 122 of FIG. 1. In at least one embodiment, computer system 500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 500 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 500 may include, without limitation, processor 502 that may include, without limitation, one or more execution units 508 to perform operations described herein, such as machine learning model training and/or inferencing operations. In at least one embodiment, computer system 500 is a single processor desktop or server system, but in another embodiment, computer system 500 may be a multiprocessor system. In at least one embodiment, processor 502 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 502 may be coupled to a processor bus 510 that may transmit data signals between processor 502 and other components in computer system 500.

In at least one embodiment, processor 502 may include, without limitation, a Level 1 ("L1") internal cache memory ("cache") 504. In at least one embodiment, processor 502 may have a single internal cache or multiple levels of internal cache. In at least one embodiment, cache memory may reside external to processor 502. Other embodiments may also include a combination of both internal and external caches depending on particular implementation and needs.

In at least one embodiment, processor 502 may include, without limitation, a Level 2 ("L2") internal cache memory ("cache") 504. The L2 cache can serve as a secondary, larger, and somewhat slower cache compared to the L1 cache that is still faster than accessing the main memory (e.g., via the memory controller hub 516). Thus, the L2 cache can enhance performance by reducing the time the processor spends accessing the main memory. In at least one embodiment, processor 502 may have a single internal L2 cache or multiple levels of internal cache. In embodiments where the processor 502 is a multi-core processor, the L2 cache can be shared among multiple cores of processor 502, providing a larger, intermediate level of cache memory for more than one processing core. In at least one embodiment, L2 cache memory may reside external to processor 502. In embodiments, the L1 cache memory and/or L2 cache memory (e.g., cache 504) may correspond to host memory 104 of FIG. 1.

In at least one embodiment, processor 502 may include, without limitation, a Level 3 ("L3") internal cache memory ("cache") 504. The L3 cache can serve as a tertiary, larger, and slower cache compared to both the L1 and L2 caches. The L3 cache can enhance performance by reducing the time the processor spends accessing the main memory. The L3 cache can be shared among multiple cores of processor 502, providing a larger pool of fast-access memory for data for the processor cores. In at least one embodiment, processor 502 may have a single internal L3 cache or multiple levels of internal cache. In at least one embodiment, L3 cache memory corresponds to host memory 104 of FIG. 1. In at least one embodiment, L3 cache memory may reside external to processor 502. Other embodiments may also include any combination of internal or external L1, L2, and/or L3 caches depending on particular implementation and needs. In at least one embodiment, register file 506 may store different types of data in various registers including, without limitation, integer registers, floating point registers, status registers, and instruction pointer register.

In at least one embodiment, execution unit 508, including, without limitation, logic to perform integer and floating point operations, also resides in processor 502. In at least one embodiment, processor 502 may also include a microcode ("ucode") read only memory ("ROM") that stores microcode for certain macro instructions. In at least one embodiment, execution unit 508 may include logic to handle a packed instruction set 509. In at least one embodiment, by including packed instruction set 509 in an instruction set of a general-purpose processor 502, along with associated circuitry to execute instructions, operations used by many multimedia applications may be performed using packed data in a general-purpose processor 502. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 508 may also be used in microcontrollers, embedded processors, graphics devices, DSPs, and other types of logic circuits. In at least one embodiment, computer system 500 may include, without limitation, a memory 520. In at least one embodiment, memory 520 may be implemented as a Dynamic Random Access Memory ("DRAM") device, a Static Random Access Memory ("SRAM") device, flash memory device, or other memory device. In at least one embodiment, memory 520 may store instruction(s) 519 and/or data 521 represented by data signals that may be executed by processor 502.

In at least one embodiment, system logic chip may be coupled to processor bus 510 and memory 520. In at least one embodiment, system logic chip may include, without limitation, a memory controller hub ("MCH") 516, and processor 502 may communicate with MCH 516 via processor bus 510. In at least one embodiment, MCH 516 may provide a high bandwidth memory path 518 to memory 520 for instruction and data storage and for storage of graphics commands, data and textures. In at least one embodiment, MCH 516 may direct data signals between processor 502, memory 520, and other components in computer system 500 and to bridge data signals between processor bus 510, memory 520, and a system I/O 522. In at least one embodiment, system logic chip may provide a graphics port for coupling to a graphics controller. In at least one embodiment, MCH 516 may be coupled to memory 520 through a high bandwidth memory path 518 and graphics/video card 512 may be coupled to MCH 516 through an Accelerated Graphics Port ("AGP") interconnect 514.

In at least one embodiment, computer system 500 may use system I/O 522 that is a proprietary hub interface bus to couple MCH 516 to I/O controller hub ("ICH") 530. In at least one embodiment, ICH 530 may provide direct connections to some I/O devices via a local I/O bus. In at least one embodiment, local I/O bus may include, without limitation, a high-speed I/O bus for connecting peripherals to memory 520, chipset, and processor 502. Examples may include, without limitation, an audio controller 529, a firmware hub ("flash BIOS") 528, a wireless transceiver 526, a data storage 524, a legacy I/O controller 523 containing user input and keyboard interfaces 525, a serial expansion port 527, such as Universal Serial Bus ("USB"), and a network controller 532, which may include in some embodiments, a data processing unit. Data storage 524 may comprise a hard disk drive, a floppy disk drive, a CD-ROM device, a flash memory device, or other mass storage device.

In at least one embodiment, FIG. 5 illustrates a system, which includes interconnected hardware devices or "chips", whereas in other embodiments, FIG. 5 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 500 are interconnected using compute express link (CXL) interconnects.

In some examples, processor 502 may include inference and/or training logic 515, which may be used to perform inferencing and/or training operations associated with one or more embodiments. In at least one embodiment, inference and/or training logic 515 may be used in system FIG. 5 for inferencing or predicting operations based, at least in part, on weight parameters calculated using neural network training operations, neural network functions and/or architectures, or neural network use cases described herein. Such operations may include AMOs in some embodiments and may benefit from the embodiments discussed herein.

Figure 6:
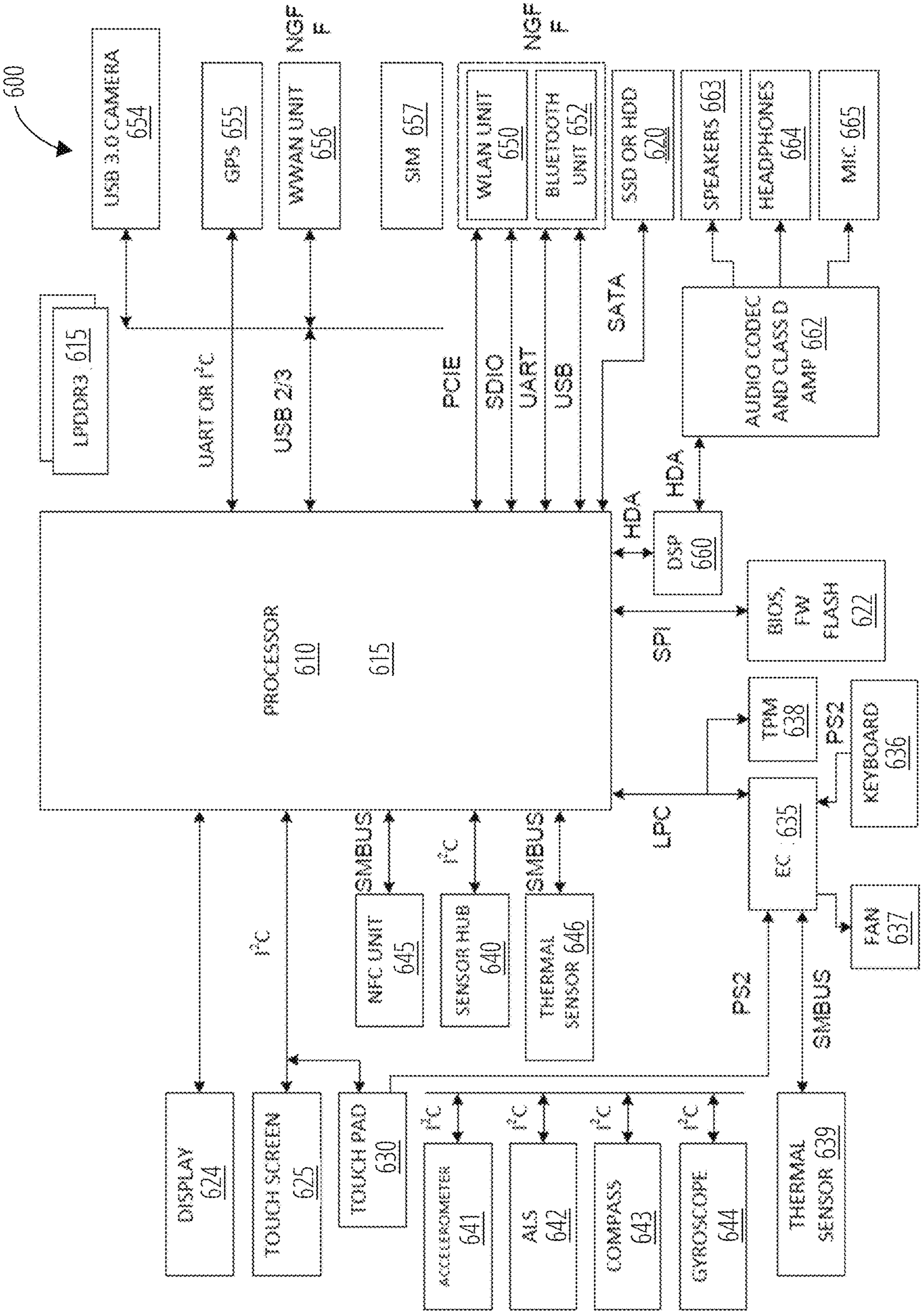
FIG. 6 is a block diagram illustrating an electronic device for utilizing a processor, according to at least one embodiment.

FIG. 6 is a block diagram illustrating an electronic device 600 for utilizing a processor 610, according to at least one embodiment. In at least one embodiment, electronic device 600 may be, for example and without limitation, a notebook, a tower server, a rack server, a blade server, a laptop, a desktop, a tablet, a mobile device, a phone, an embedded computer, an edge device, an IoT device, or any other suitable electronic device. In at least one embodiment, electronic device 600 corresponds to target node 102 and/or remote node 122 of FIG. 1.

In at least one embodiment, electronic device 600 may include, without limitation, processor 610 communicatively coupled to any suitable number or kind of components, peripherals, modules, or devices. In at least one embodiment, processor 610 coupled using a bus or interface, such as a I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 6 illustrates a system, which includes interconnected hardware devices or "chips", whereas in other embodiments, FIG. 6 may illustrate an exemplary System on a Chip ("SoC"). In at least one embodiment, devices illustrated in FIG. 6 may be interconnected with proprietary interconnects, standardized interconnects (e.g., PCIe) or some combination thereof. In at least one embodiment, one or more components of FIG. 6 are interconnected using compute express link (CXL) interconnects.

In at least one embodiment, FIG. 6 may include a display 624, a touch screen 625, a touch pad 630, a Near Field Communications unit ("NFC") 645, a sensor hub 640, a thermal sensor 646, an Express Chipset ("EC") 635, a Trusted Platform Module ("TPM") 638, BIOS/firmware/flash memory ("BIOS, FW Flash") 622, a DSP 660, a drive 620 such as a Solid State Disk ("SSD") or a Hard Disk Drive ("HDD"), a wireless local area network unit ("WLAN") 650, a Bluetooth unit 652, a Wireless Wide Area Network unit ("WWAN") 656, a Global Positioning System (GPS) 655, a camera ("USB 3.0 camera") 654 such as a USB 3.0 camera, and/or a Low Power Double Data Rate ("LPDDR") memory unit ("LPDDR3") 615 implemented in, for example, LPDDR3 standard. These components may each be implemented in any suitable manner.

In at least one embodiment, other components may be communicatively coupled to processor 610 through components discussed above. In at least one embodiment, an accelerometer 641, Ambient Light Sensor ("ALS") 642, compass 643, and a gyroscope 644 may be communicatively coupled to sensor hub 640. In at least one embodiment, thermal sensor 639, a fan 637, a keyboard 636, and a touch pad 630 may be communicatively coupled to EC 635. In at least one embodiment, speaker 663, headphones 664, and microphone ("mic") 665 may be communicatively coupled to an audio unit ("audio codec and class d amp") 662, which may in turn be communicatively coupled to DSP 660. In at least one embodiment, audio unit 662 may include, for example and without limitation, an audio coder/decoder ("codec") and a class D amplifier. In at least one embodiment, SIM card ("SIM") 657 may be communicatively coupled to WWAN unit 656. In at least one embodiment, components such as WLAN unit 650 and Bluetooth unit 652, as well as WWAN unit 656 may be implemented in a Next Generation Form Factor ("NGFF").

In at least one embodiment, inference and/or training logic 515 may be used in system FIG. 6 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Servers and Data Centers

The following figures set forth, without limitation, exemplary network server and data center based systems that can be used to implement at least one embodiment.

Datacenters may include multiple network switches in a particular topology, such as a fat tree topology, a slim fly topology, a dragonfly topology, and/or the like. The specifications and makeup of the network switches in the topology affects the overall network performance (e.g., bandwidth capability) of the datacenter.

Example Data Center Environment

Figure 7A:
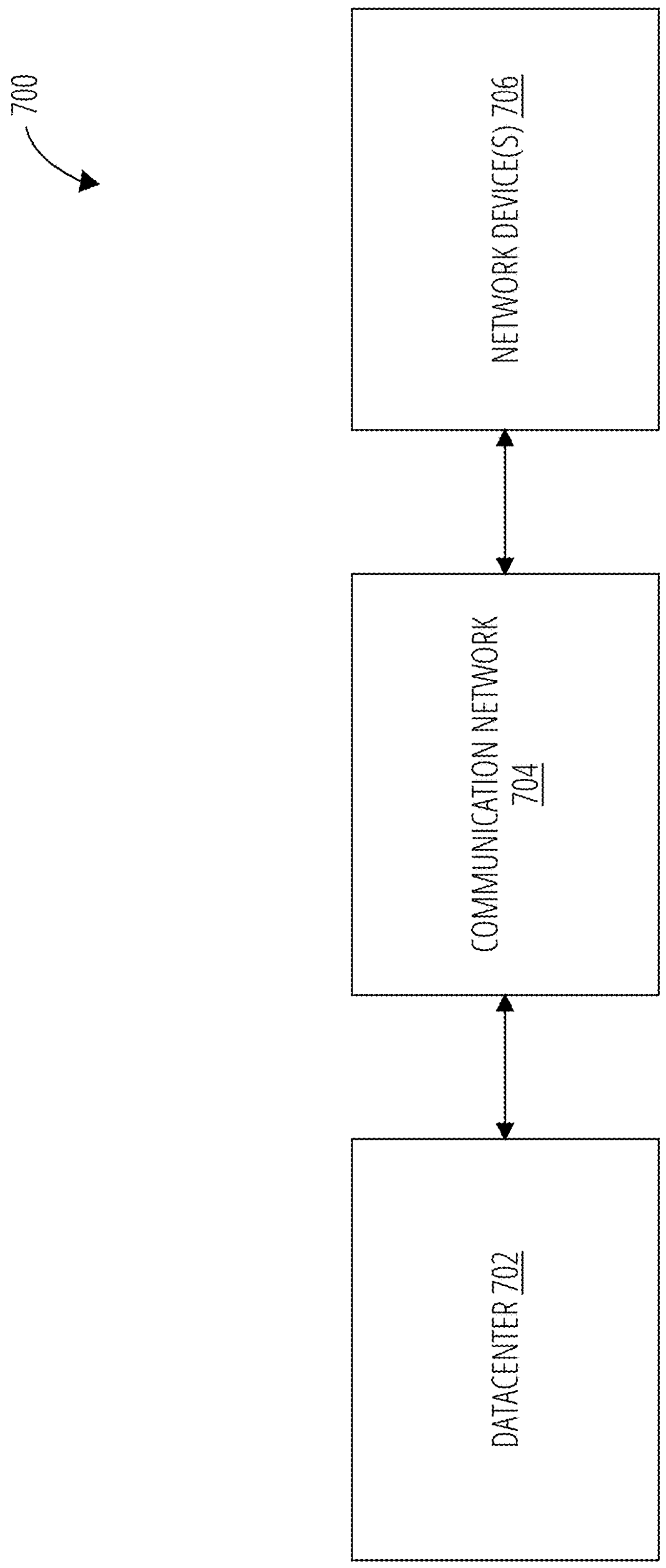
FIG. 7A is a block diagram of an example network architecture, according to at least one embodiment.
Figure 7B:
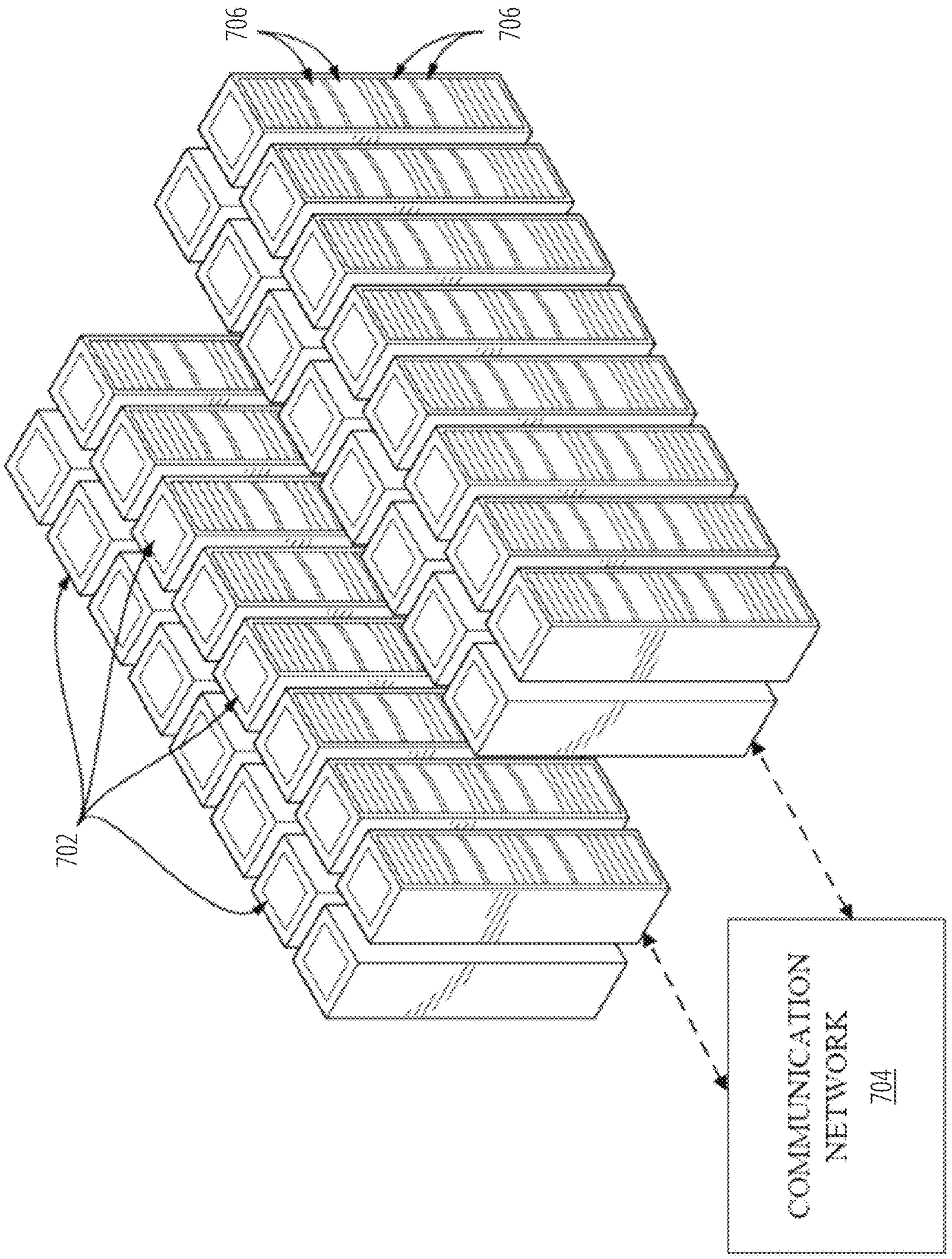
FIG. 7B is a block diagram of an example network architecture, according to at least one embodiment.

Datacenters, high performance computing clusters, and/or the like are often formed of various computing components or networked devices, and communication networks formed of electrical and/or optical devices may be used to enable communication between the networked devices forming these implementations. With reference to FIG. 7A and FIG. 7B, for example, a network architecture 700 may include a datacenter 702, a communication network 704, and network device(s) 706. The network architecture 700 may illustrate a general computing architecture within which more specific systems and/or subsystems may function.

For example, the datacenter 702 may be a centralized facility designed to house computing resources and related components. The datacenter 702 may operate to support the infrastructure required for advanced computational tasks, for efficient, secure, and reliable operations. The datacenter 702 may include the building and structural components, including power supplies, cooling systems, fire suppression systems, and physical security measures that are configured to maintain optimal operating conditions and/or protect the equipment from environmental hazards and unauthorized access. An example datacenter 702 may include high-performance servers or compute nodes, often arranged in racks, such as those illustrated in FIG. 7B, and connected through high-speed networks as described herein. These servers may include processors (e.g., central processing units (CPUs), graphics processing units (GPUs), data processing units (DPUs) and/or the like), memory (e.g., RAM), and storage solutions (e.g., hard disk drives (HDDs), solid state drives (SSDs), and/or the like. The hardware configuration may be designed for parallel processing and high throughput, catering to the demands of high-performance computing (HPC) applications.

The datacenter 702 may include high-speed network equipment, such as network switches, routers, firewalls, and/or the like to facilitate fast and secure data transmission within the datacenter 702 (e.g., between the servers or compute nodes) and between external networks. The datacenter 702 may facilitate communication between servers or compute nodes through a network topology that ensures efficient data exchange, minimizes latency, and maximizes bandwidth. The network topology may dictate how various network devices, such as switches and routers, are interconnected for data flow. By implementing an effective network topology, the datacenter 702 may support high-performance computing tasks. Examples of various network topologies may include hierarchical networking topologies such as the fat tree topology, Slim Fly topology, Dragonfly topology, and/or the like.

The communication network 704 may communicably couple the datacenter 702 with network device(s) 706 and other external devices for data exchange and connectivity. Examples of the communication network 704 may include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. The ability of the communication network 704 to incorporate multiple network types and configurations may allow the datacenter 702 to adapt to diverse application needs, from general data communication to specialized HPC tasks. As described herein, the communication network 704 may leverage various optical components to establish communication links (e.g., communicably couple) between components in the architecture 700. As such, the communication network 704 may include various optical devices, transceivers, modules, and/or the like that are configured to generate optical signals (e.g., provide optical transmitter functionality) and/or receive optical signals (e.g., provide optical receiver functionality).

The network device(s) 706 may include a variety of computing devices capable of transmitting and receiving signals over the communication network 704. The network device(s) 706 may range from personal computing devices to complex server configurations. Examples include Personal Computers (PCs), laptops, tablets, smartphones, and servers. The network device(s) 706 may facilitate user interactions with the datacenter 702, allowing for data input, retrieval, and processing from remote locations. In addition to individual computing devices, the network device(s) 706 may also include collections of servers or additional datacenters. For instance, these could be other datacenters similar to or the same as datacenter 702. Such an interconnection may allow for the formation of a distributed computing environment for improved redundancy, load balancing, and disaster recovery capabilities. By linking multiple datacenters, the network architecture 700 may leverage geographically dispersed resources, optimizing performance and ensuring high availability.

As described herein, the datacenter 702 and/or the network device(s) 706 may include storage devices and processing circuitry for executing computing tasks, such as controlling the flow of data internally and over the communication network 704. The processing circuitry may include software, hardware, or a combination thereof. For example, the processing circuitry may include a memory containing executable instructions and a processor (e.g., a microprocessor) that executes these instructions. The memory may correspond to any suitable type of memory device or collection of memory devices configured to store instructions. Non-limiting examples of suitable memory devices include Flash memory, Random Access Memory (RAM), Read Only Memory (ROM), variants thereof, combinations thereof, or similar technologies. In specific embodiments, the memory and processor may be integrated into a common device, such as a microprocessor with integrated memory. Additionally, or alternatively, the processing circuitry may comprise hardware components, such as an application-specific integrated circuit (ASIC). Other non-limiting examples of processing circuitry include Integrated Circuit (IC) chips, CPUs, GPUs, microprocessors, Field Programmable Gate Arrays (FPGAs), collections of logic gates or transistors, resistors, capacitors, inductors, and diodes. Some or all of the processing circuitry may be provided on a Printed Circuit Board (PCB) or a collection of PCBs. It should be appreciated that any appropriate type of electrical component or collection of electrical components may be suitable for inclusion in the processing circuitry.

In addition, although not explicitly shown, the present disclosure contemplates that the datacenter 702 and network device(s) 706 may include one or more communication interfaces for facilitating wired and/or wireless communication between one another and other unillustrated elements of the network architecture 700. These communication interfaces may include a variety of technologies, including but not limited to Ethernet ports, fiber optic connections, Wi-Fi® transceivers, Bluetooth® modules, and cellular communication modules for integration and interoperability among the various components within the network architecture 700.

Furthermore, the present disclosure contemplates that the network architecture 700 may include additional components and functionalities. For example, the network architecture may include, without limitation, additional processing units, specialized accelerators (such as Tensor Processing Units or TPUs), enhanced security modules, and redundant power supplies. The inclusion of these elements may be intended to ensure that the network architecture 700 is robust, scalable, and capable of meeting diverse operational requirements. Any variations, modifications, or adaptations of the described elements that fall within the spirit and scope of the disclosure are considered to be encompassed by the present disclosure. This includes any combinations, sub-combinations, or enhancements of the various described elements to achieve improved performance, reliability, and efficiency in the network architecture 700.

Figure 8:
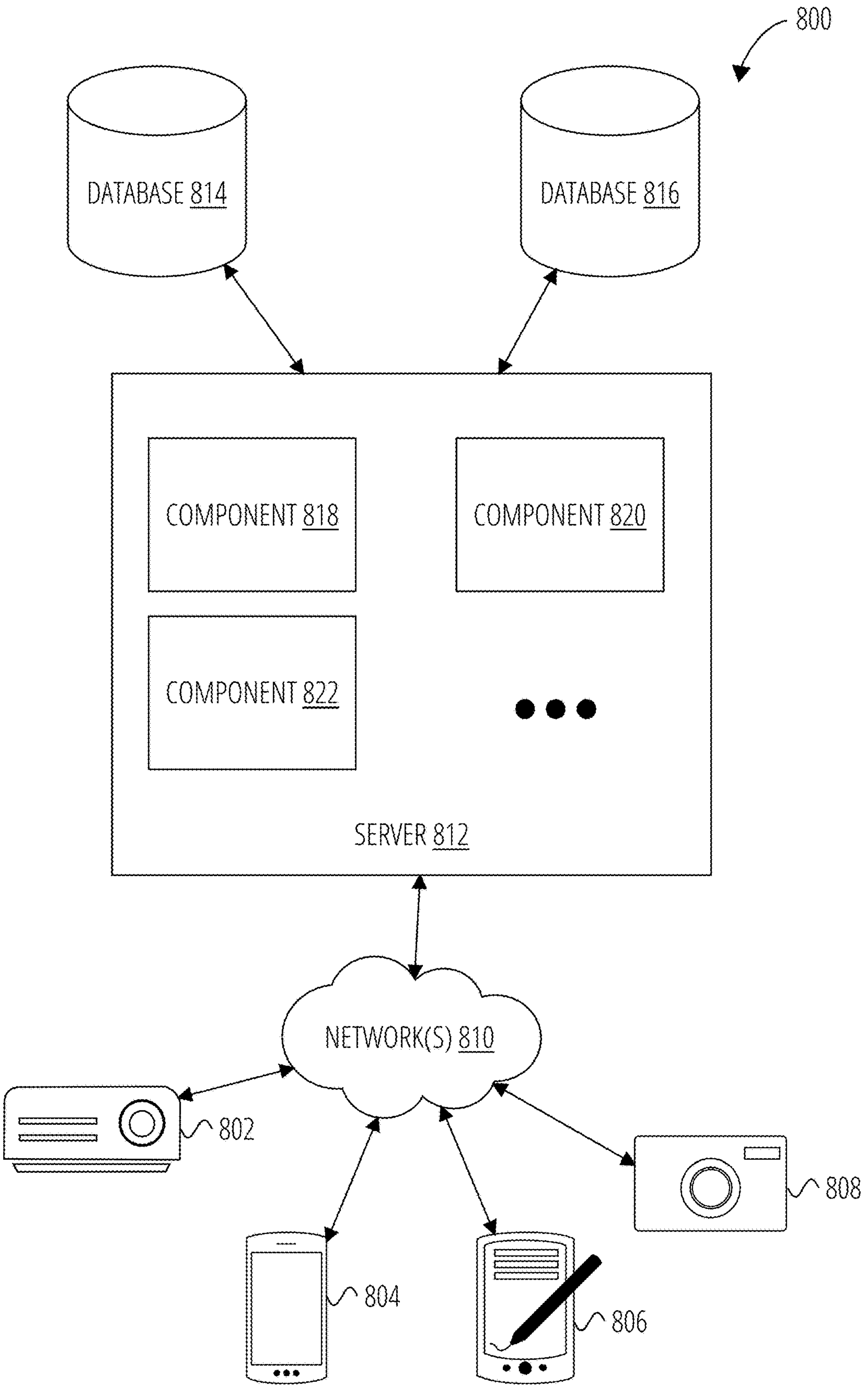
FIG. 8 illustrates a distributed system, in accordance with at least some embodiments.

FIG. 8 illustrates a distributed system 800, in accordance with at least some embodiments. In at least one embodiment, distributed system 800 includes one or more client computing devices 802, 804, 806, and 808, which are configured to execute and operate a client application such as a web browser, proprietary client, and/or variations thereof over one or more network(s) 810. In at least one embodiment, server 812 may be communicatively coupled with remote client computing devices 802, 804, 806, and 808 via network(s) 810. In at least one embodiment, client computing devices 802, 804, 806, 808 and/or server 812 may correspond to target node 102 and/or remote node 122 of FIG. 1.

In at least one embodiment, server 812 may be adapted to run one or more services or software applications such as services and applications that may manage session activity of single sign-on (SSO) access across multiple data centers. In at least one embodiment, server 812 may also provide other services or software applications can include non-virtual and virtual environments. In at least one embodiment, these services may be offered as web-based or cloud services or under a Software as a Service (SaaS) model to users of client computing devices 802, 804, 806, and/or 808. In at least one embodiment, users operating client computing devices 802, 804, 806, and/or 808 may in turn utilize one or more client applications to interact with server 812 to utilize services provided by these components.

In at least one embodiment, software components 818, 820 and 822 of distributed system 800 are implemented on server 812. In at least one embodiment, one or more components of distributed system 800 and/or services provided by these components may also be implemented by one or more of client computing devices 802, 804, 806, and/or 808. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

In at least one embodiment, client computing devices 802, 804, 806, and/or 808 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 810. Although distributed system 800 in FIG. 8 is shown with four client computing devices, any number of client computing devices may be supported. Other devices, such as devices with sensors, etc., may interact with server 812.

In at least one embodiment, network(s) 810 in distributed system 800 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 810 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 812 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 812 using software defined networking. In at least one embodiment, server 812 may be adapted to run one or more services or software applications.

In at least one embodiment, server 812 may run any operating system, as well as any commercially available server operating system. In at least one embodiment, server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 812 may include one or more applications to analyze and consolidate data feeds and/or event updates received from users of client computing devices 802, 804, 806, and 808. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 812 may also include one or more applications to display data feeds and/or real-time events via one or more display devices of client computing devices 802, 804, 806, and 808.

In at least one embodiment, distributed system 800 may also include one or more databases 814 and 816. In at least one embodiment, databases may provide a mechanism for storing information such as user interactions information, usage patterns information, adaptation rules information, and other information. In at least one embodiment, databases 814 and 816 may reside in a variety of locations. In at least one embodiment, one or more of databases 814 and 816 may reside on a non-transitory storage medium local to (and/or resident in) server 812. In at least one embodiment, databases 814 and 816 may be remote from server 812 and in communication with server 812 via a network-based or dedicated connection. In at least one embodiment, databases 814 and 816 may reside in a storage-area network (SAN). In at least one embodiment, any necessary files for performing functions attributed to server 812 may be stored locally on server 812 and/or remotely, as appropriate. In at least one embodiment, databases 814 and 816 may include relational databases, such as databases that are adapted to store, update, and retrieve data in response to SQL-formatted commands.

Figure 9:
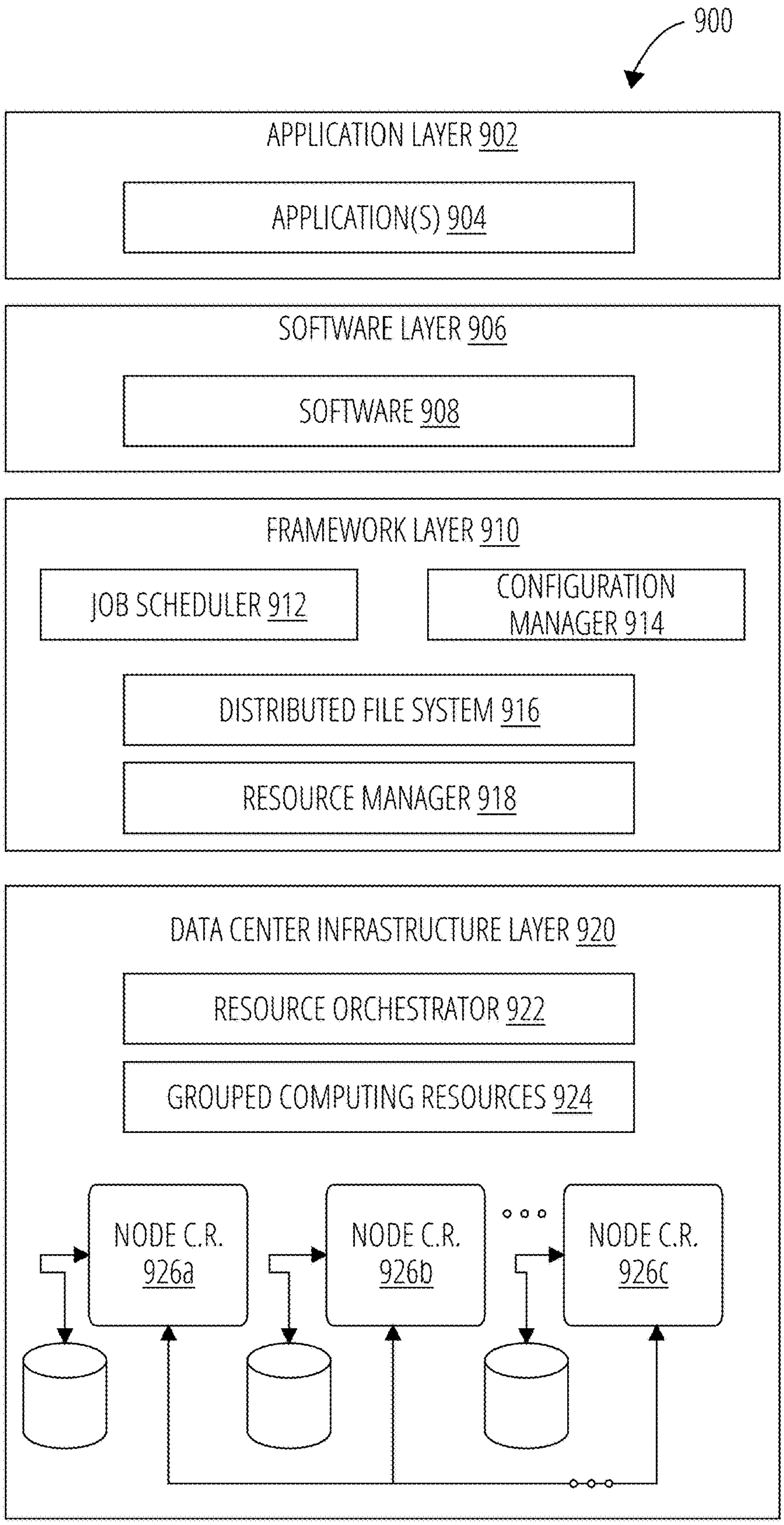
FIG. 9 illustrates an exemplary data center, according to at least one embodiment.

FIG. 9 illustrates an exemplary data center 900, according to at least one embodiment. In at least one embodiment, data center 900 includes, without limitation, a data center infrastructure layer 920, a framework layer 910, a software layer 906 and an application layer 902.

In at least one embodiment, as shown in FIG. 9, data center infrastructure layer 920 may include a resource orchestrator 922, grouped computing resources 924, and node computing resources ("node C.R.s") 926*a*-926*c*, where "c" represents any whole, positive integer. In at least one embodiment, node C.R.s 926*a*-926*c* may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 926*a*-926*c* (e.g., node C.R. 926*b*) may be a server having one or more of above-mentioned computing resources. In some embodiments, at least one of node C.R.s 926*a*, 926*b*, and 926*c* may correspond to target node 102 and/or remote node 122 of FIG. 1.

In at least one embodiment, grouped computing resources 924 may include separate groupings of node C.R.s housed within one or more racks (not shown), or many racks housed in data centers at various geographical locations (also not shown). Separate groupings of node C.R.s within grouped computing resources 924 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 926*a*-926*c* and/or grouped computing resources 924. In at least one embodiment, resource orchestrator 922 may include a software design infrastructure ("SDI") management entity for data center 900. In at least one embodiment, resource orchestrator 922 may include hardware, software or some combination thereof.

In at least one embodiment, as shown in FIG. 9, framework layer 910 includes, without limitation, a job scheduler 912, a configuration manager 914, a resource manager 918, and a distributed file system 916. In at least one embodiment, framework layer 910 may include a framework to support software 908 of software layer 906 and/or one or more application(s) 904 of application layer 902. In at least one embodiment, software 908 or application(s) 904 may respectively include web-based service software or applications, such as those provided by Amazon Web Services, Google Cloud and Microsoft Azure. In at least one embodiment, framework layer 910 may be, but is not limited to, a type of free and open-source software web application framework such as Apache Spark™ (hereinafter "Spark") that may utilize distributed file system 916 for large-scale data processing (e.g., "big data"). In at least one embodiment, job scheduler 912 may include a Spark driver to facilitate scheduling of workloads supported by various layers of data center 900. In at least one embodiment, configuration manager 914 may be capable of configuring different layers such as software layer 906 and framework layer 910, including Spark and distributed file system 916 for supporting large-scale data processing. In at least one embodiment, resource manager 918 may be capable of managing clustered or grouped computing resources mapped to or allocated for support of distributed file system 916 and job scheduler 912. In at least one embodiment, clustered or grouped computing resources may include grouped computing resources 924 at data center infrastructure layer 920. In at least one embodiment, resource manager 918 may coordinate with resource orchestrator 922 to manage these mapped or allocated computing resources.

In at least one embodiment, software 908 included in software layer 906 may include software used by at least portions of node C.R.s 926*a*-926*c*, grouped computing resources 924, and/or distributed file system 916 of framework layer 910. One or more types of software may include, but are not limited to, Internet web page search software, e-mail virus scan software, database software, and streaming video content software.

In at least one embodiment, application(s) 904 included in application layer 902 may include one or more types of applications used by at least portions of node C.R.s 926*a*-926*c*, grouped computing resources 924, and/or distributed file system 916 of framework layer 910. In at least one or more types of applications may include, without limitation, CUDA applications, 5G network applications, artificial intelligence application, data center applications, and/or variations thereof.

In at least one embodiment, any of configuration manager 914, resource manager 918, and resource orchestrator 922 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

Figure 10:
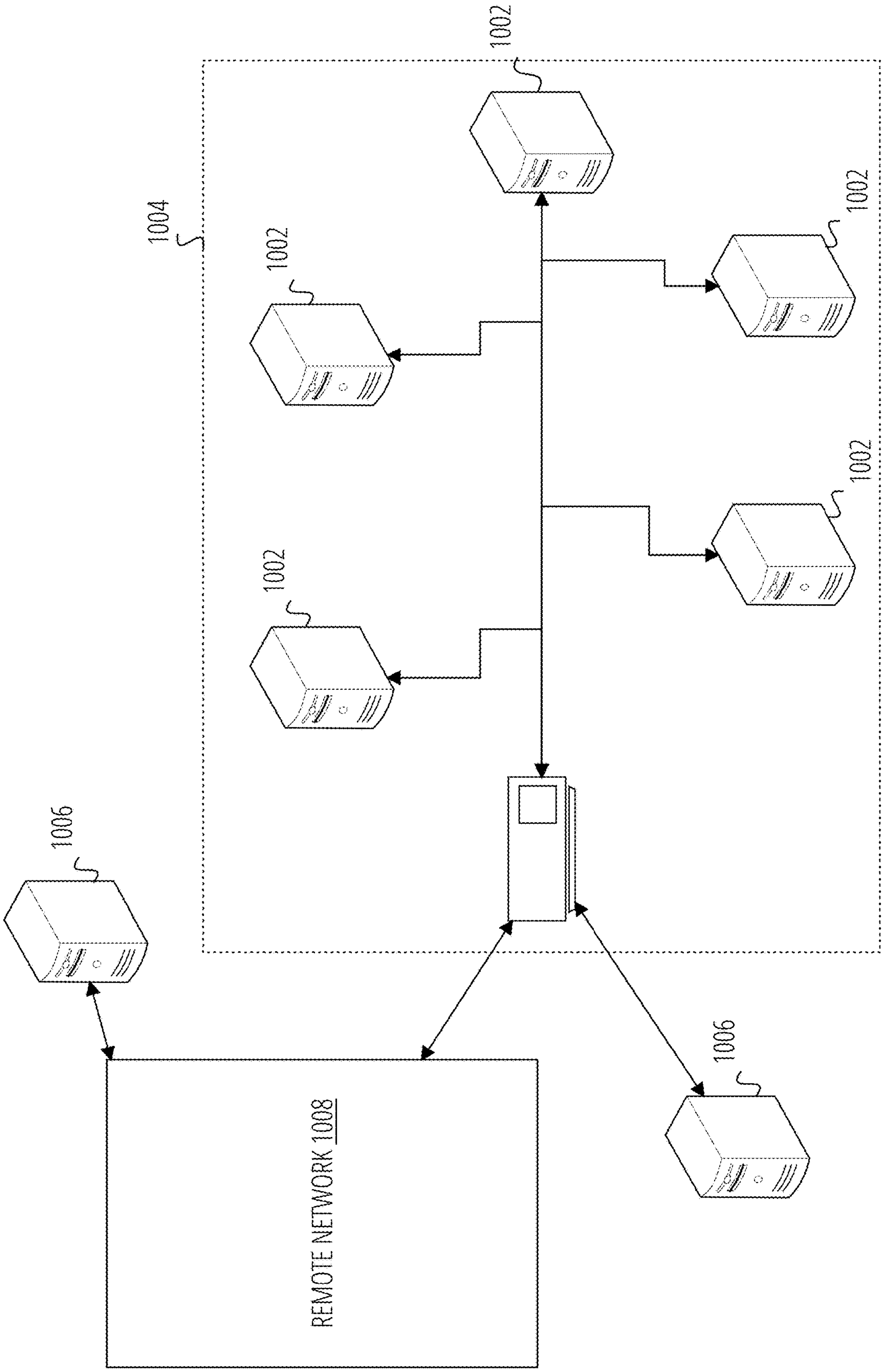
FIG. 10 illustrates a client-server network formed by a plurality of network server computers which are interlinked, in accordance with at least one embodiment.

FIG. 10 illustrates a client-server network 1004 formed by a plurality of network server computers 1002 which are interlinked, in accordance with at least one embodiment. In at least one embodiment, each network server computer 1002 stores data accessible to other network server computers 1002 and to client computers 1006 and remote networks 1008 which link into a wide area client-server network 1004. In at least one embodiment, configuration of a client-server network 1004 may change over time as client computers 1006 and one or more remote networks 1008 connect and disconnect from a client-server network 1004, and as one or more trunk line server computers 1002 are added or removed from a client-server network 1004. In at least one embodiment, when a client computer 1006 and a remote network 1008 are connected with network server computers 1002, client-server network includes such client computer 1006 and remote network 1008. In at least one embodiment, the term computer includes any device or machine capable of accepting data, applying prescribed processes to data, and supplying results of processes.

In at least one embodiment, network server computers 1002 can correspond to target node 102 of FIG. 1, and client computers 1006 can correspond to remote node 122 of FIG. 1.

In at least one embodiment, client-server network 1004 stores information which is accessible to network server computers 1002, remote networks 1008 and client computers 1006. In at least one embodiment, network server computers 1002 are formed by main frame computers minicomputers, and/or microcomputers having one or more processors each. In at least one embodiment, server computers 1002 are linked together by wired and/or wireless transfer media, such as conductive wire, fiber optic cable, and/or microwave transmission media, satellite transmission media or other conductive, optic or electromagnetic wave transmission media. In at least one embodiment, client computers 1006 access a network server computer 1002 by a similar wired or a wireless transfer medium. In at least one embodiment, a client computer 1006 may link into a client-server network 1004 using a modem and a standard telephone communication network. In at least one embodiment, alternative carrier systems such as cable and satellite communication systems also may be used to link into client-server network 1004. In at least one embodiment, other private or time-shared carrier systems may be used. In at least one embodiment, client-server network 1004 is a global information network, such as the Internet. In at least one embodiment, network is a private intranet using similar protocols as the Internet, but with added security measures and restricted access controls. In at least one embodiment, client-server network 1004 is a private, or semi-private network using proprietary communication protocols.

In at least one embodiment, client computer 1006 is any end user computer, and may also be a mainframe computer, mini-computer or microcomputer having one or more microprocessors. In at least one embodiment, server computer 1002 may at times function as a client computer accessing another server computer 1002. In at least one embodiment, remote network 1008 may be a local area network, a network added into a wide area network through an independent service provider (ISP) for the Internet, or another group of computers interconnected by wired or wireless transfer media having a configuration which is either fixed or changing over time. In at least one embodiment, client computers 1006 may link into and access a client-server network 1004 independently or through a remote network 1008.

Figure 11:
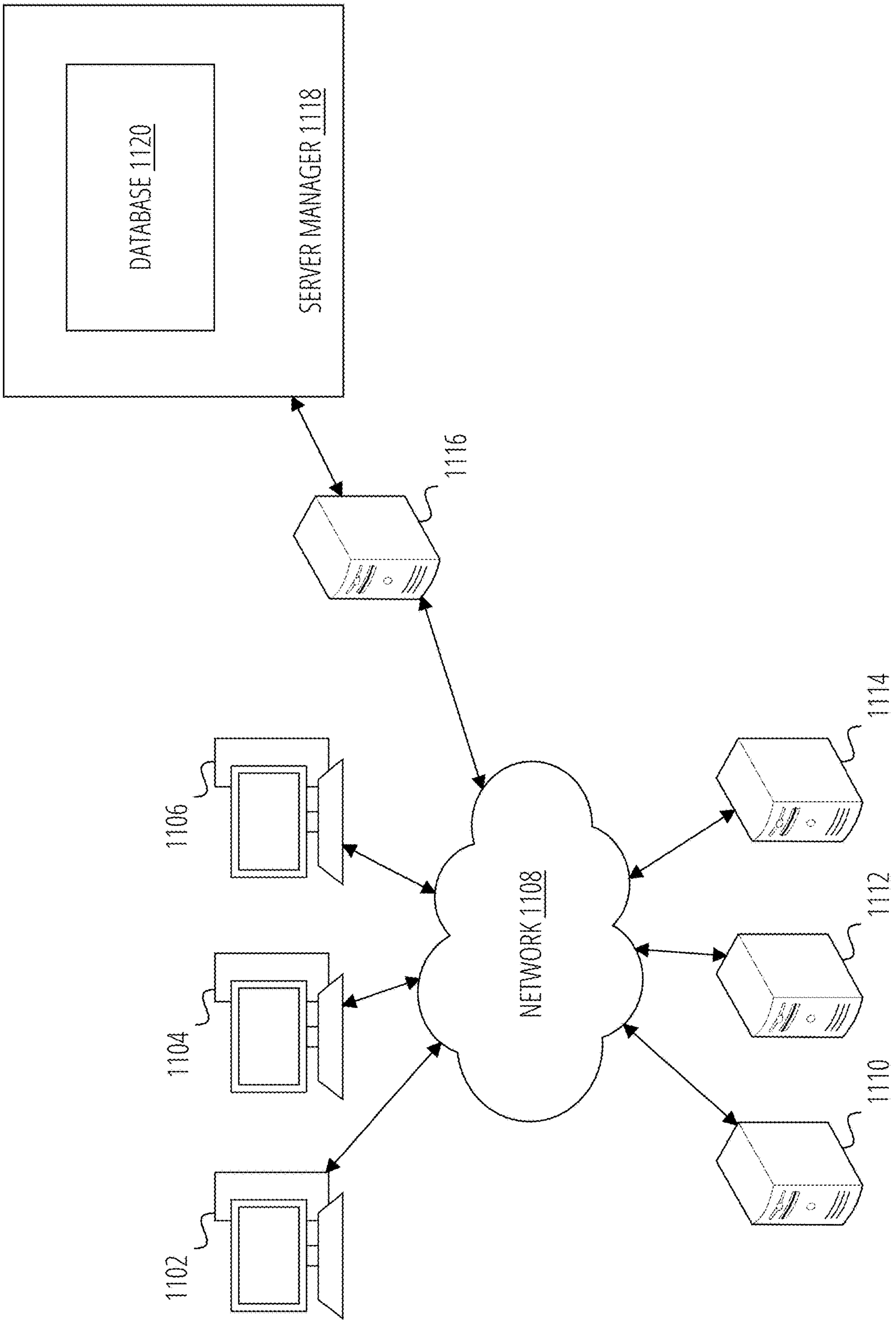
FIG. 11 illustrates a computer network connecting one or more computing machines, in accordance with at least some embodiments.

FIG. 11 illustrates a computer network 1108 connecting one or more computing machines, in accordance with at least some embodiments. In at least one embodiment, network 1108 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1108 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1108 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1108 comprises the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g. www.site.com) which maps to an IP address of a network server.

In at least one embodiment, a plurality of clients 1102, 1104, and 1106 are connected to a network 1108 via respective communication links. In at least one embodiment, each of these clients may access a network 1108 via any desired form of communication, such as via a dial-up modem connection, cable link, a digital subscriber line (DSL), wireless or satellite link, or any other form of communication. In at least one embodiment, each client may communicate using any machine that is compatible with a network 1108, such as a personal computer (PC), work station, dedicated terminal, personal data assistant (PDA), or other similar equipment. In at least one embodiment, clients 1102, 1104, and 1106 may or may not be located in a same geographical area.

In at least one embodiment, at least one of the plurality of clients 1102, 1104, and 1106 may correspond to target node 102 and/or remote node 122 of FIG. 1.

In at least one embodiment, a plurality of servers 1110, 1112, and 1114 are connected to a network 1108 to serve clients that are in communication with a network 1108. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1110, 1112, and 1114 run application programs that respond to client commands. In at least one embodiment, server 1110 may run a web server application for responding to client requests for HTML pages and may also run a mail server application for receiving and routing electronic mail. In at least one embodiment, other application programs, such as an FTP server or a media server for streaming audio/video data to clients may also be running on a server 1110. In at least one embodiment, different servers may be dedicated to performing different tasks. In at least one embodiment, server 1110 may be a dedicated web server that manages resources relating to web sites for various users, whereas a server 1112 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1110, 1112, and 1114 are under control of a web hosting provider in a business of maintaining and delivering third party content over a network 1108.

In at least one embodiment, web hosting providers deliver services to two different types of clients. In at least one embodiment, one type, which may be referred to as a browser, requests content from servers 1110, 1112, and 1114 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1116 is in communication with a network 1108 via a communication link. In at least one embodiment, intranet server 1116 is in communication with a server manager 1118. In at least one embodiment, server manager 1118 comprises a database of an application program configuration parameters which are being utilized in servers 1110, 1112, and 1114. In at least one embodiment, users modify a database 1120 via an intranet server 1116, and a server manager 1118 interacts with servers 1110, 1112, and 1114 to modify application program parameters so that they match a content of a database. In at least one embodiment, a user logs onto an intranet server 1116 by connecting to an intranet server 1116 via client 1102 and entering authentication information, such as a username and password.

In at least one embodiment, when a user wishes to sign up for new service or modify an existing service, an intranet server 1116 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1116 updates a database 1120. In at least one embodiment, server manager 1118 forwards this information to an appropriate server, and a new parameter is used during application program operation. In at least one embodiment, an intranet server 1116 is configured to provide users with access to configuration parameters of hosted network resources (e.g., web pages, email, FTP sites, media sites, etc.), for which a user has contracted with a web hosting service provider.

Figure 12A:
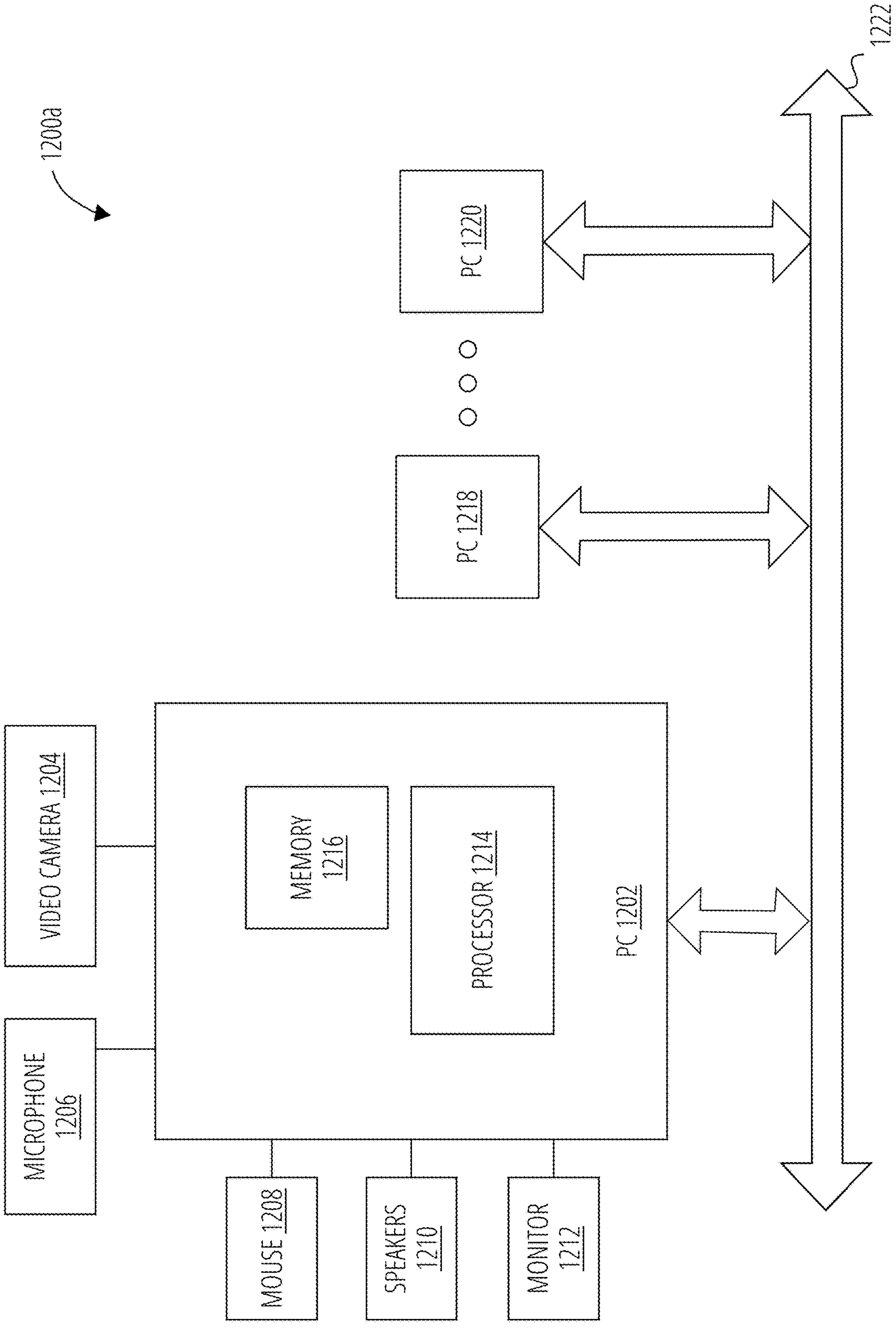
FIG. 12A illustrates a networked computer system, in accordance with at least some embodiments.

FIG. 12A illustrates a networked computer system 1200*a*, in accordance with at least some embodiments. In at least one embodiment, networked computer system 1200*a* comprises a plurality of nodes or personal computers ("PCs") 1202, 1218, 1220. In at least one embodiment, PC 1202 (e.g., a node) comprises a processor 1214, memory 1216, video camera 1204, microphone 1206, mouse 1208, speakers 1210, and monitor 1212. In at least one embodiment, PCs 1202, 1218, 1220 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, PCs 1202, 1218, 1220 and other nodes of a network are interconnected via medium 1222. In at least one embodiment, medium 1222 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, at least one of PCs 1202, 1218, and 1220 may correspond to target node 102 and/or remote node 122 of FIG. 1.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may comprise other nodes or elements such as routers, servers, and/or variations thereof.

In at least one embodiment, processor 1214 is a general-purpose programmable processor. In at least one embodiment, processors of nodes of networked computer system 1200*a* may also be special-purpose video processors. In at least one embodiment, various peripherals and components of a node such as those of PC 1202 may vary from those of other nodes. In at least one embodiment, PC 1218 and PC 1220 may be configured identically to or differently than PC 1202. In at least one embodiment, a node may be implemented on any suitable computer system in addition to PC systems.

Figure 12B:
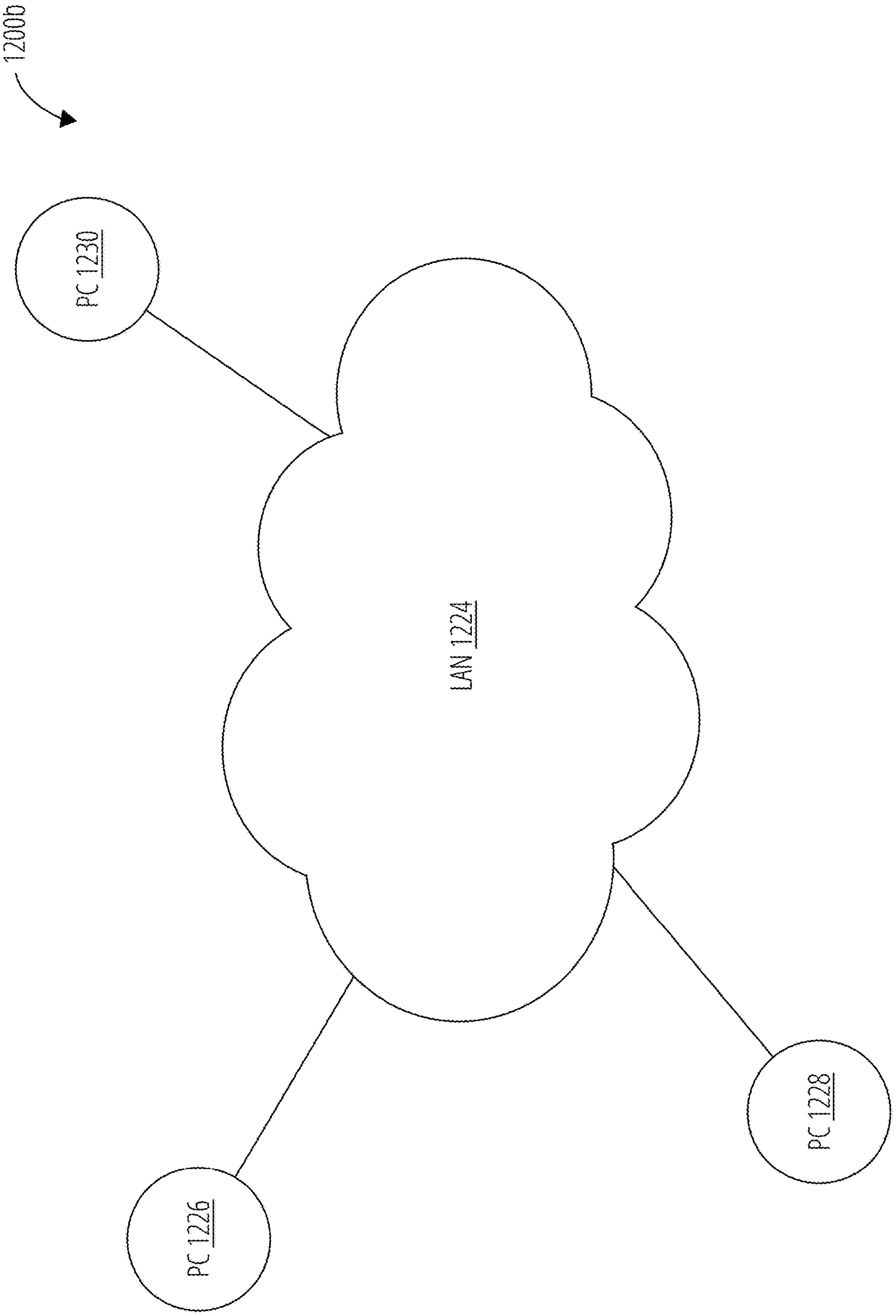
FIG. 12B illustrates a networked computer system, in accordance with at least some embodiments.

FIG. 12B illustrates a networked computer system 1200*b*, in accordance with at least some embodiments. In at least one embodiment, networked computer system 1200*b* illustrates a network such as LAN 1224, which may be used to interconnect a variety of nodes that may communicate with each other. In at least one embodiment, attached to LAN 1224 are a plurality of nodes such as PCs 1226, 1228, 1230. In at least one embodiment, a node (e.g. PC) may also be connected to the LAN via a network server or other means. In at least one embodiment, networked computer system 1200*b* comprises other types of nodes or elements, for example including routers, servers, and nodes.

In at least one embodiment, at least one of PCs 1226, 1228, and 1230 may correspond to target node 102 and/or remote node 122 of FIG. 1. For example, PC 1226 may correspond to target node 102, and PC 1228 may correspond to remote node 122.

Figure 12C:
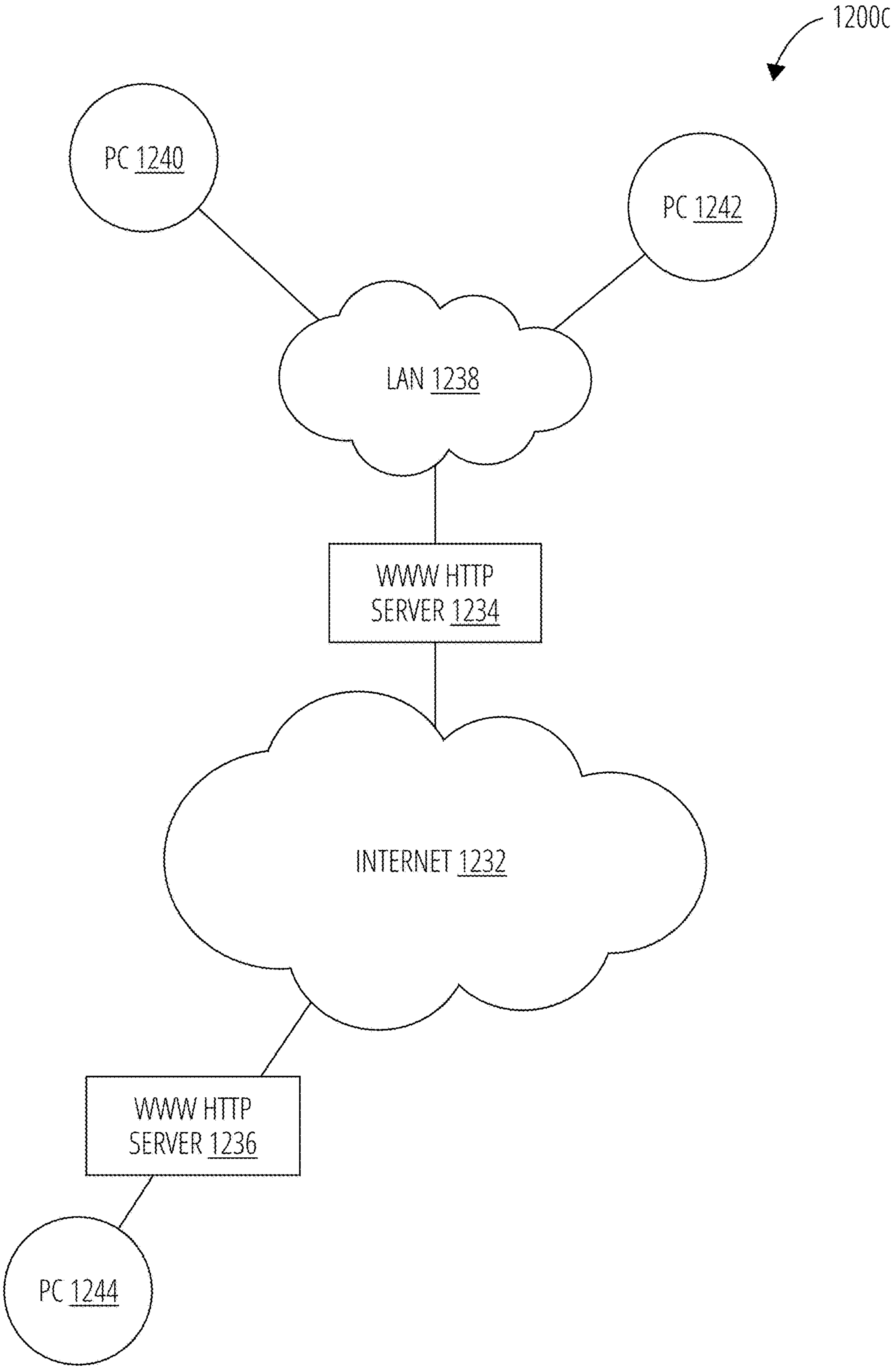
FIG. 12C illustrates a networked computer system, in accordance with at least some embodiments.

FIG. 12C illustrates a networked computer system 1200*c*, in accordance with at least some embodiments. In at least one embodiment, networked computer system 1200*c* illustrates a WWW system having communications across a backbone communications network such as Internet 1232, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1232 in WWW are a plurality of nodes such as PCs 1240, 1242, 1244. In at least one embodiment, a node is interfaced to other nodes of WWW through a WWW HTTP server such as WWW HTTP servers 1234, 1236. In at least one embodiment, PC 1244 may be a PC forming a node of internet 1232 and itself running its WWW HTTP server 1236, although PC 1244 and WWW HTTP server 1236 are illustrated separately in FIG. 12C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1238 as illustrated with respect to WWW HTTP server 1234. In at least one embodiment, networked computer system 1200*c* may also comprise other types of nodes or elements. In at least one embodiment, a WWW HTTP server is an application running on a machine, such as a PC. In at least one embodiment, each user may be considered to have a unique "server," as illustrated with respect to PC 1244. In at least one embodiment, a server may be considered to be a server such as WWW HTTP server 1234, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

In at least one embodiment, at least one of PCs 1240, 1242, and 1244 may correspond to target node 102 and/or remote node 122 of FIG. 1. For example, PC 1240 may correspond to target node 102, and PC 1242 may correspond to remote node 122.

Figure 13:
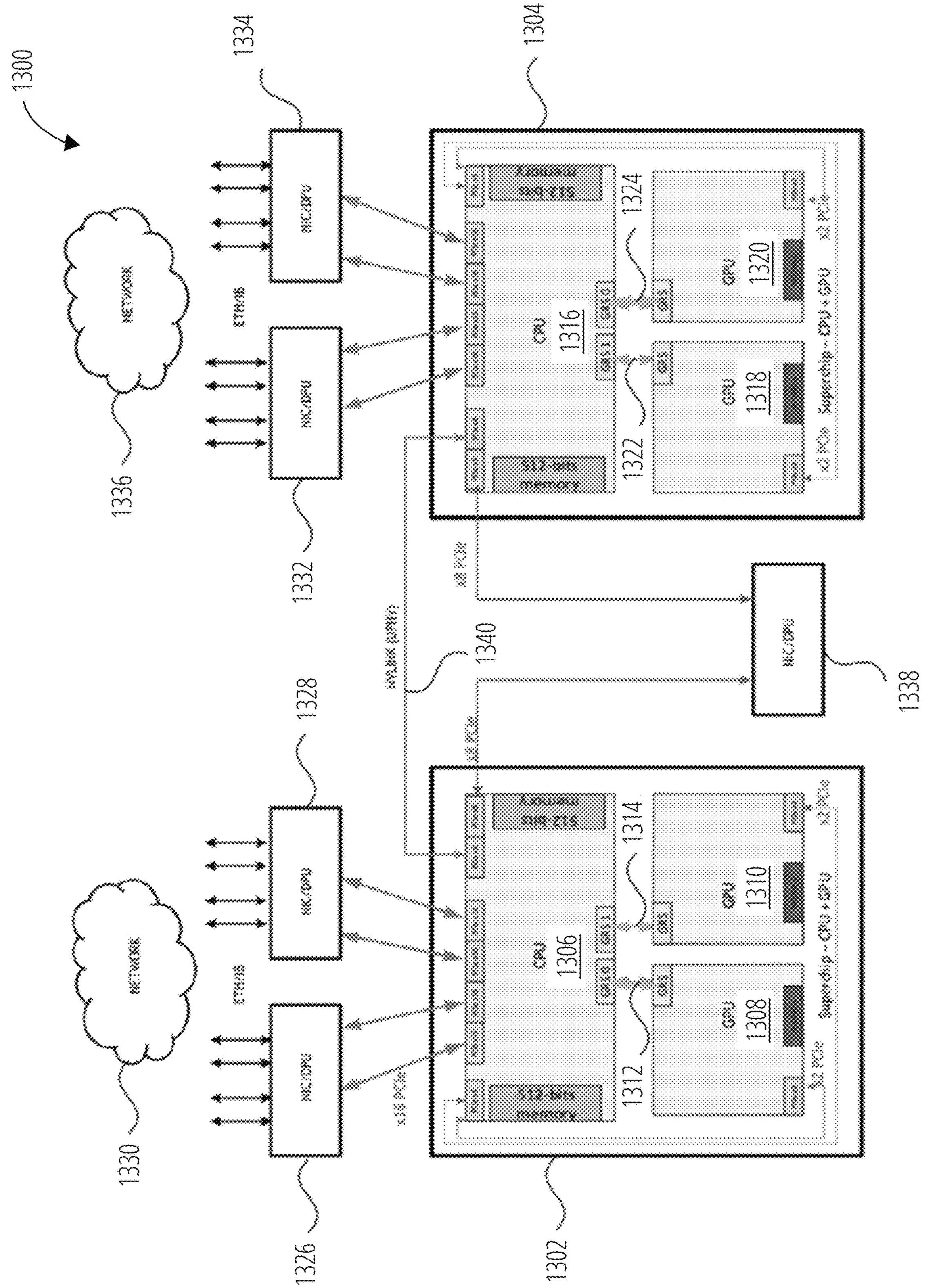
FIG. 13 is a block diagram of a computing system having two processing devices coupled to each other and multiple networks, according to at least one embodiment.

FIG. 13 is a block diagram of a computing system 1300 having two processing devices coupled to each other and multiple networks, according to at least one embodiment. The computing system 1300 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 1300. The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system 1300 highly suitable for demanding applications that require significant processing power, such as artificial intelligence (AI), machine learning (ML), and data-intensive computing, while ensuring robust connectivity and scalability across various networked environments. The integrated circuits of the computing system 1300 can include one or more CPUs and one or more GPUs. An example architecture of a multi-GPU architecture is illustrated in FIG. 13.

As illustrated in FIG. 13, the computing system 1300 includes a processing device 1302 with a multi-GPU architecture. In particular, the processing device 1302 includes a CPU 1306, a GPU 1308, and a GPU 1310. The CPU 1306 can be coupled to the GPU 1308 via an die-to-die (D2D) or chip-to-chip (C2C) interconnect 1312, such as a Ground-Referenced Signaling interconnect (GRS interconnect). The CPU 1306 can be coupled to the GPU 1310 via a D2D or C2C interconnect 1314. The CPU 1306 can also couple to the GPU 1308 and GPU 1310 via PCIe interconnects. The CPU 1306 can be coupled to one or more network interface cards (NICs) or data processing units (DPUs), which are coupled to one or more networks. For example, as illustrated in FIG. 13, the CPU 1306 is coupled to a first NIC/DPU 1326, which is coupled to a network 1330. The CPU 1306 is also coupled to a second NIC/DPU 1328, which is coupled to the network 1330. The NIC/DPU 1326 and NIC/DPU 1328 can be coupled to the network 1330 over Ethernet (ETH) or InfiniBand (IB) connections.

The computing system 1300 also includes a processing device 1304 with a multi-GPU architecture. In particular, the processing device 1304 includes a CPU 1316, a GPU 1318, and a GPU 1320. The CPU 1316 can be coupled to the GPU 1318 via an D2D or C2C interconnect 1322. The CPU 1316 can be coupled to the GPU 1320 via a D2D or C2C interconnect 1324. The CPU 1316 can also couple to the GPU 1318 and GPU 1320 via PCIe interconnects. The CPU 1316 can be coupled to one or more NICs or DPUs, which are coupled to one or more networks. For example, as illustrated in FIG. 13, the CPU 1316 is coupled to a first NIC/DPU 1332, which is coupled to a network 1336. The CPU 1316 is also coupled to a second NIC/DPU 1334, which is coupled to the network 1336. The NIC/DPU 1332 and NIC/DPU 1334 can be coupled to the network 1336 over Ethernet (ETH) or InfiniBand (IB) connections.

In at least one embodiment, the processing device 1302 and the processing device 1304 can communication with each other via a NIC/DPU 1338, such as over PCIe interconnects. The processing device 1302 and processing device 1304 can also communicate with each other over a high-bandwidth communication interconnects 1340, such as an NVLink interconnect or other high-speed interconnects.

In at least one embodiment, the computing system 1300 is used for high-speed network communication and includes a processing unit (e.g., CPU 1306, GPU 1308, GPU 1310, CPU 1316, GPU 1318, GPU 1320, NIC/DPU 1326, NIC/DPU 1328, NIC/DPU 1332, NIC/DPU 1334, or NIC/DPU 1338), and a network interface coupled to the processing unit. The network interface includes a receiver circuit, a Forward Error Correction (FEC) circuit operatively coupled to the receiver circuit, and a controller operatively coupled to the receiver circuit and the FEC circuit. The controller can receive equalized error data from the receiver circuit. The controller can determine, using the equalized error data and a nominal signal power, a SNR deviation metric, the SNR deviation metric being indicative of an estimated post-FEC bit error rate (BER) of the FEC circuit. The controller can adjust, based on the SNR deviation metric, at least one of a FEC parameter of the FEC circuit or a link parameter of the receiver circuit. In some embodiments, one or more of NIC/DPU 1326, NIC/DPU 1328, NIC/DPU 1332, NIC/DPU 1334, or NIC/DPU 1338 are "smart NICs" as disclosed herein.

Figure 14:
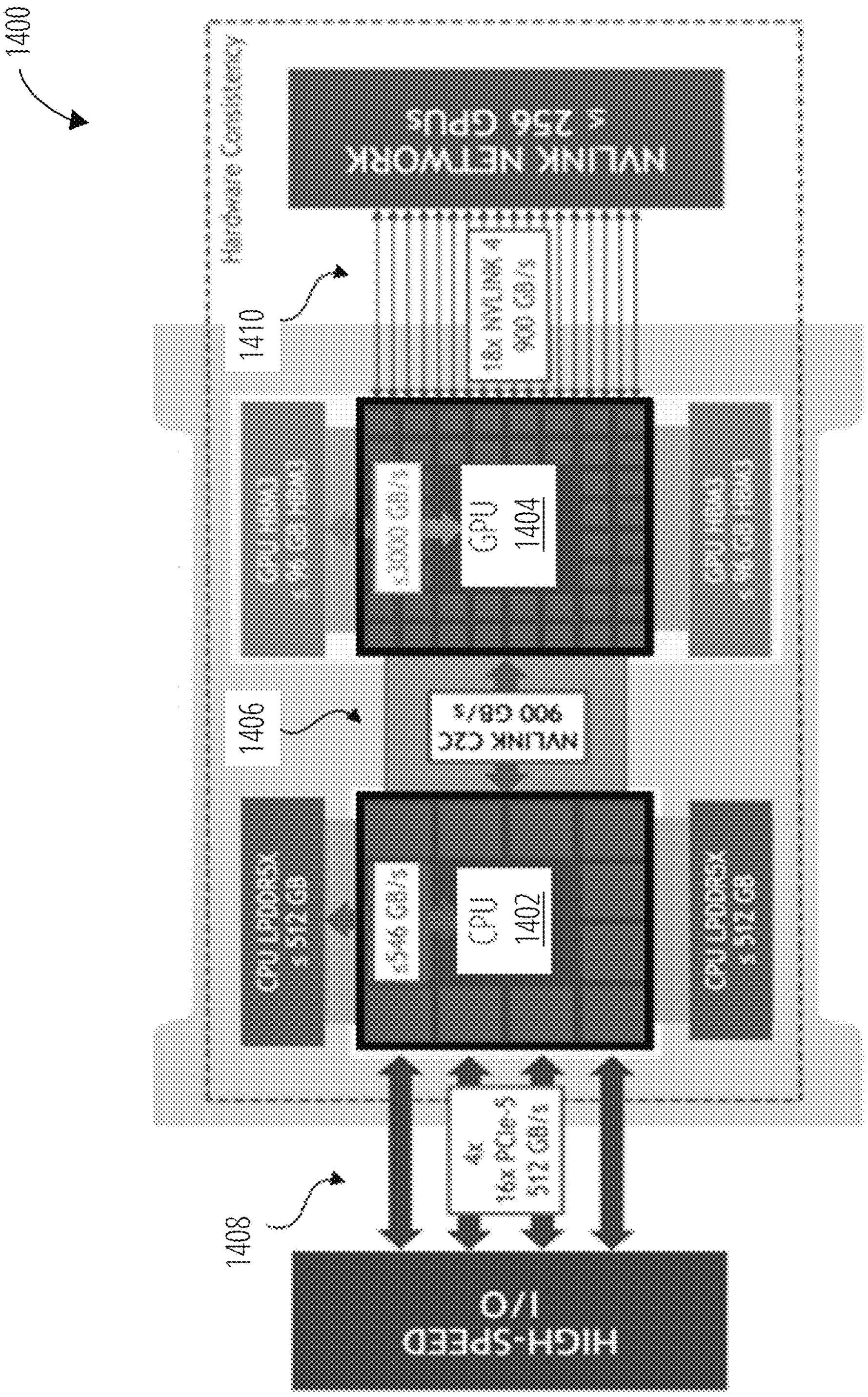
FIG. 14 is a block diagram of a computing system having a CPU and a GPU in a single integrated circuit, according to at least one embodiment.

FIG. 14 is a block diagram of a computing system 1400 having a CPU 1402 and a GPU 1404 in a single integrated circuit, according to at least one embodiment. The computing system 1400 can be a highly integrated design where a CPU 1402 and GPU 1404 are connected on a single integrated circuit, utilizing an NVLink C2C (Chip-to-Chip) interconnect 1406 to enable fast, low-latency communication between the two processing units. This close integration allows for efficient data transfer and parallel processing between the CPU 1402 and GPU 1404, optimizing performance for complex computational tasks. The GPU elements within the computing system 1400 can be interconnected using an NVLink network, allowing for scalability up to 256 GPU elements, creating a powerful, unified processing environment ideal for large-scale AI, ML, and high-performance computing applications. The NVLink network can be a GPU fabric of high-bandwidth communication interconnects 1410. Additionally, the computing system 1400 can be designed to interface with a high-speed I/O through PCIe interconnects 1408, ensuring rapid data transfer to and from external devices, further enhancing the system's capabilities in handling data-intensive tasks and providing robust connectivity to peripheral components. It should be noted that the C2C interconnects 1406 can be considered D2D interconnects since the CPU 1402 and the GPU 1404 are located on the same integrated circuit. The integrated circuit can include CPU memory (also referred to as main memory) and GPU memory, which are accessible by the CPU 1402 and the GPU 1404, respectively, over high-speed interconnects. The computing system 1400 can bring together performance of the GPU 1404 with the versatility of the CPU 1402. The CPU 1402 can be connected with a high-bandwidth and memory coherent C2C interconnects 1406 in a single integrated circuit. The computing system 1400 can support a link switch system.

In at least one embodiment, the computing system 1400 is used for high-speed network communication and includes a processing unit (e.g., CPU 1402, GPU 1404, NVLink network), and a network interface coupled to the processing unit. In some embodiments, computing system 1400 can include a "smart NIC," as disclosed herein. In some embodiments, computing system 1400 can be part of an RDMA network and can use the smart NIC for efficient performance of AMO RPCs.

Figure 15:
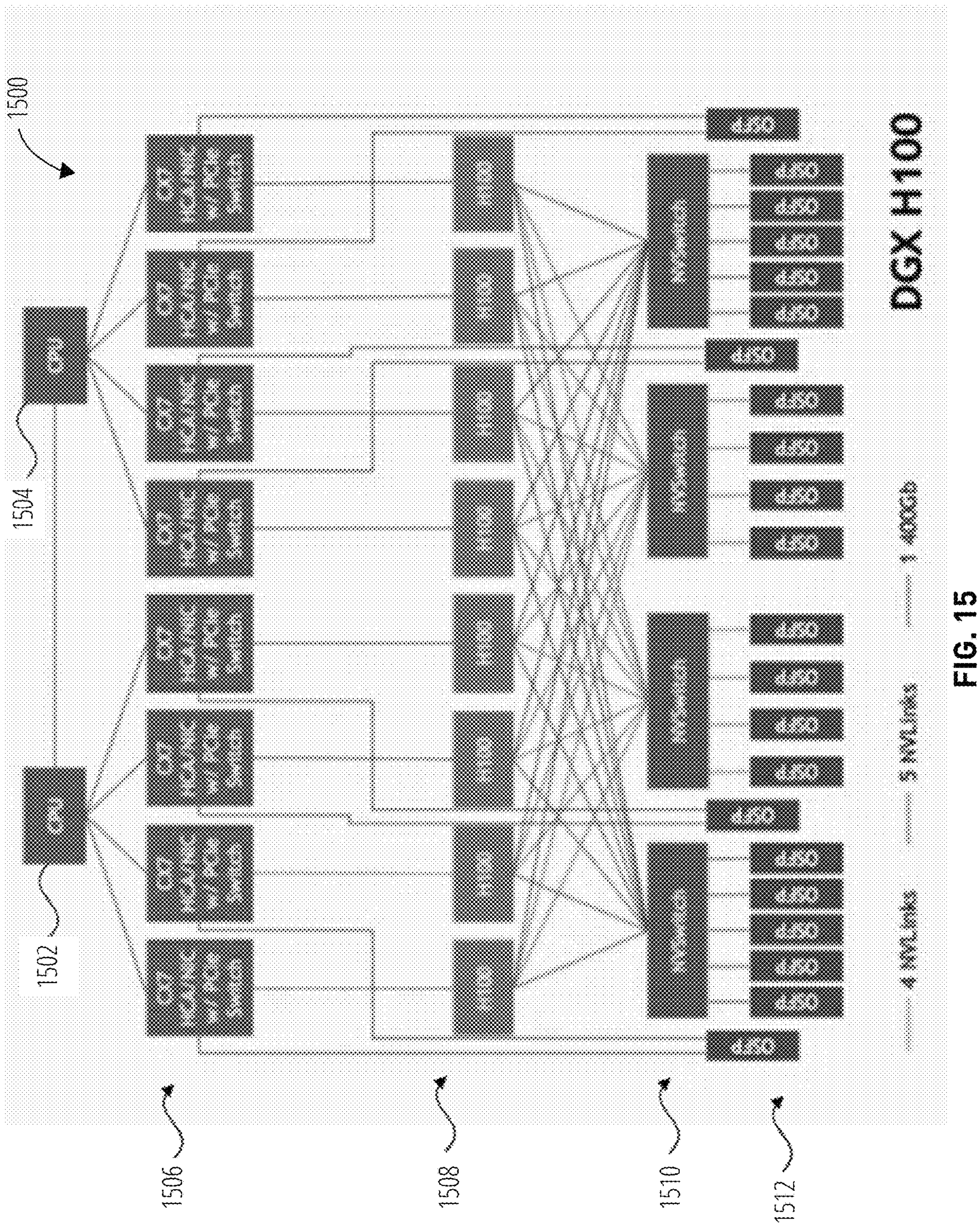
FIG. 15 is a block diagram of a computing system having tensor core GPUs, according to at least one embodiment.

FIG. 15 is a block diagram of a computing system 1500 having tensor core GPUs 1508, according to at least one embodiment. The computing system 1500 can be a DBX H100 system, which is a high-performance computing platform designed to meet the demands of AI, ML, and deep learning (DL) workloads. The computing system 1500 can include multiple tensor core GPUs 1508 (e.g., NVIDIA H100 Tensor Core GPUs). The tensor core GPUs 1508 can each be one of the integrated circuits described above with respect to FIG. 15. The tensor core GPUs 1508 can be optimized for AI/ML/DL applications, offering exceptional performance for deep learning training, inference, and high-performance computing tasks. The tensor core GPUs 1508 within the computing system 1500 are interconnected using high-speed communication interfaces like NVLinks, enabling rapid data transfer between them, which is crucial for handling large-scale AI models and datasets with low latency. This computing system 1500 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 1508, the computing system 1500 can include advanced cooling solutions and power management features to ensure safe operation while maintaining peak performance. It is supported by a comprehensive software ecosystem, including NVIDIA's CUDA programming model, AI frameworks like TensorFlow and PyTorch, and other HPC and AI software tools, which enable developers and researchers to harness the full power of the tensor core GPUs 1508 for their specific applications. The computing system 1500 is ideally suited for large-scale AI model training, real-time inference, scientific simulations, data analytics, and other compute-intensive tasks that require massive parallel processing power.

The tensor core GPUs 1508 can be coupled to multiple CPUs, such as CPU 1502 and CPU 1504, using switches 1506 (e.g., CX7 HCA/NIC with PCIe switch). The tensor core GPUs 1508 can be coupled to each other via switches 1510 (e.g., NVSwitches). The switches 1506 and switches 1510 can be coupled to high-speed transceiver modules 1512. The high-speed transceiver modules 1512 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 800 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 1500 remains capable of meeting increasing data demands and can be upgraded to support future advancements in network speeds, thus contributing to the system's overall performance and scalability.

In at least one embodiment, the computing system 1500 can be considered a data-network configuration with full-bandwidth intra-server NVLinks. In this example, all eight tensor core GPUs 1508 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 1508 can half-subscribe eighteen NVLinks to GPUs in other servers. Four tensor core GPUs 1508 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 1508 can independently transfer data, using Remote Direct Memory Access (RDMA) protocol, over its own dedicated switch (e.g., 400 Gb/s HCA/NIC) in an multi-rail InfiniBand/Ethernet configuration. In this example, 800 GBps of aggregate full-duplex to non-NVLink network devices.

In at least one embodiment, the computing system 1500 is used for high-speed network communication and includes a processing unit (e.g., CPU 1502, CPU 1504, switches 1506, tensor core GPUs 1508, switches 1510, high-speed transceiver modules 1512), and a network interface coupled to the processing unit. In some embodiments, the network interface can be a "smart NIC," as disclosed herein.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two but can be more when so indicated either explicitly or by context. Further, unless stated otherwise or otherwise clear from context, the phrase "based on" means "based at least in part on" or "based at least on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, in some embodiments, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:

data processing unit (DPU) associated with a network interface controller (NIC), the DPU comprising a first memory and one or more processors, coupled to the first memory, the one or more processors to:

receive an atomic memory operation (AMO) remote procedure call (RPC) comprising a memory address associated with a second memory associated with one or more host processors and an AMO type;

retrieve a value corresponding to the memory address of the AMO RPC from at least one of the first memory or the second memory;

perform an AMO corresponding to the AMO type on the value from the second memory to obtain a modified value; and store the modified value in the first memory.

2. The system of claim 1, wherein the AMO RPC is received from the one or more host processors.

3. The system of claim 1, wherein the one or more processors are further to:

determine, between at least the first memory and the second memory, a target memory for the modified value; and store the modified value in the target memory.

4. The system of claim 1, wherein the one or more processors are further to store the modified value in the second memory.

5. The system of claim 4, wherein the one or more processors are to store the modified value in the second memory responsive a memory flush trigger.

6. The system of claim 5, wherein the memory flush trigger is at least one of:

receiving a memory flush instruction; or determining, based on one or more heuristics, that a state of the system satisfies a flushing criterion.

7. The system of claim 1, wherein the AMO corresponding to the AMO type comprises at least one of:

a compare and swap operation;

a fetch and add operation;

a fetch and store operation;

a fetch and exclusive or (XOR) operation;

an atomic increment operation;

an atomic decrement operation;

a swap operation; or a software-defined operation.

8. The system of claim 1, wherein the AMO RPC is received from a remote processing device.

9. The system of claim 1, further comprising:
a host computing device connected to the NIC, the host computing device comprising one or more host processors and the second memory, wherein the second memory is associated with the one or more host processors, and wherein the memory address of the AMO RPC is directed to the second memory associated with the one or more host processors.

10. A method comprising:
receiving, by a first processor of a data processing unit (DPU) associated with a network interface controller (NIC), the first processor coupled to a first memory, an atomic memory operation (AMO) remote procedure call (RPC) comprising a memory address associated with a second memory associated with one or more host processors and an AMO type;
retrieving a value corresponding to the memory address of the AMO RPC from at least one of the first memory or the second memory;
performing, by the first processor, an AMO corresponding to the AMO type on the value from the second memory to obtain a modified value; and
storing the modified value in the first memory.

11. The method of claim 10, further comprising storing the modified value in the second memory.

12. The method of claim 11, wherein the storing the modified value in the second memory is performed responsive to a memory flush trigger.

13. The method of claim 12, wherein the memory flush trigger is at least one of:
receiving a memory flush instruction; or
determining, based on one or more heuristics, that a state of a network of devices satisfies a flushing criterion, wherein the network of devices comprises a first device that comprises the first processor and the first memory.

14. The method of claim 10, wherein the AMO corresponding to the AMO type comprises at least one of:
a compare and swap operation;
a fetch and add operation;
a fetch and store operation;
a fetch and exclusive or (XOR) operation;
an atomic increment operation;
an atomic decrement operation;
a swap operation; or
a software-defined operation.

15. The method of claim 10, wherein the AMO RPC is received from a remote processing device.

16. A data processing unit (DPU) associated with a network interface controller (NIC), the DPU comprising processing circuitry to perform operations comprising:
receiving an atomic memory operation (AMO) remote procedure call (RPC) comprising a memory address associated with an external memory associated with one or more host processors and an AMO type;
retrieving a value corresponding to the memory address of the AMO RPC from at least one of a local memory or the external memory;
performing an AMO corresponding to the AMO type on the value from the external memory to obtain a modified value; and
storing the modified value in the local memory.

17. The DPU of claim 16, the operations further comprising storing the modified value in the external memory.

18. The DPU of claim 17, wherein the storing the modified value in the external memory is responsive to a memory flush trigger.

19. The DPU of claim 18, wherein the memory flush trigger is at least one of:
receiving a memory flush instruction; or
determining, based on one or more heuristics, that a state of the DPU and/or the local memory satisfies a flushing criterion.

20. A datacenter comprising:
a plurality of host computing devices interconnected via a plurality of switches, wherein one or more host computing devices of the plurality of host computing devices comprises:
one or more host processors;
a host memory associated with the one or more host processors; and
a data processing unit (DPU) associated with a network interface controller (NIC), the DPU comprising an additional memory and one or more additional processors coupled to the additional memory, the one or more additional processors to:
receive an atomic memory operation (AMO) remote procedure call (RPC) comprising a memory address associated with the host memory and an AMO type;
retrieve a value corresponding to the memory address of the AMO RPC from at least one of the additional memory or the host memory;
perform an AMO corresponding to the AMO type on the value from the host memory to obtain a modified value; and
store the modified value in the additional memory.

21. The datacenter of claim 20, wherein the one or more additional processors are further to:
determine, between at least the host memory and the additional memory, a target memory for the modified value; and
store the modified value in the target memory.

22. The datacenter of claim 20, wherein the one or more additional processors are further to store the modified value in the host memory.

23. The datacenter of claim 22, wherein the one or more additional processors are to store the modified value in the host memory responsive to a memory flush trigger.

24. The datacenter of claim 23, wherein the memory flush trigger is at least one of:
receiving a memory flush instruction; or
determining, based on one or more heuristics, that a state of the datacenter satisfies a flushing criterion.

25. The datacenter of claim 20, wherein the AMO corresponding to the AMO type comprises at least one of:
a compare and swap operation;
a fetch and add operation;
a fetch and store operation;
a fetch and exclusive or (XOR) operation;
an atomic increment operation;
an atomic decrement operation;
a swap operation; or
a software-defined operation.

26. The datacenter of claim 20, wherein the AMO RPC is received from a remote processing device.

27. The system of claim 1, wherein the one or more processors are further to:
receive a second AMO RPC comprising the memory address;
retrieve the modified value from the first memory; and
perform a second AMO on the modified value to obtain a second modified value.

28. The system of claim 1, wherein the one or more host processors are to:

determine that the memory address is cached in the first memory; and trigger a flush of the first memory to the second memory prior to accessing the second memory.

* * * * *